US008243625B2

(12) United States Patent
Chen et al.

(10) Patent No.: US 8,243,625 B2
(45) Date of Patent: Aug. 14, 2012

(54) SYSTEMS AND METHODS FOR IMPLEMENTING MULTI-TOPOLOGY SUPPORT FOR LABEL DISTRIBUTION PROTOCOL (LPD) OF A MULTIPROTOCOL LABEL SWITCHING NETWORK

(75) Inventors: Huaimo Chen, Bolton, MA (US); Qianglin Q. Zhao, Boxborough, MA (US); Hua A. Liu, Boxborough, MA (US)

(73) Assignee: FutureWei Technologies, Inc., Plano, TX (US)

( * ) Notice: Subject to any disclaimer, the term of this patent is extended or adjusted under 35 U.S.C. 154(b) by 108 days.

(21) Appl. No.: 12/432,103

(22) Filed: Apr. 29, 2009

(65) Prior Publication Data

US 2009/0274066 A1 Nov. 5, 2009

Related U.S. Application Data

(60) Provisional application No. 61/048,937, filed on Apr. 29, 2008.

(51) Int. Cl.
*H04L 12/28* (2006.01)
(52) U.S. Cl. ............... 370/255; 370/466; 370/395.5; 370/392
(58) Field of Classification Search ........... 370/254.255, 370/395.5, 254, 255, 260, 295.5
See application file for complete search history.

(56) References Cited

U.S. PATENT DOCUMENTS

| 6,452,942 | B1 * | 9/2002 | Lemieux | 370/468 |
| 6,611,532 | B1 * | 8/2003 | Madour et al. | 370/466 |
| 7,436,782 | B2 * | 10/2008 | Ngo et al. | 370/254 |
| 7,593,352 | B2 * | 9/2009 | Verma | 370/255 |
| 7,646,772 | B2 * | 1/2010 | Sivabalan et al. | 370/395.2 |
| 7,899,916 | B1 * | 3/2011 | Bumstead et al. | 709/228 |
| 2005/0097203 | A1 * | 5/2005 | Unbehagen et al. | 709/223 |
| 2007/0030846 | A1 * | 2/2007 | Szczesniak et al. | 370/389 |
| 2007/0127502 | A1 | 6/2007 | Zhu | |
| 2008/0151905 | A1 * | 6/2008 | Krzanowski | 370/395.5 |
| 2008/0186978 | A1 * | 8/2008 | Geib | 370/395.31 |
| 2008/0267175 | A1 * | 10/2008 | Mo et al. | 370/357 |
| 2009/0175194 | A1 * | 7/2009 | Akhter et al. | 370/254 |

FOREIGN PATENT DOCUMENTS

| CN | 1455568 A | 11/2003 |
| CN | 1581818 A | 2/2005 |
| JP | 2006128999 A | 5/2006 |

OTHER PUBLICATIONS

Andersson, L. et al., "LDP Specification," RFC 5036, The IETF Trust, 135 pages, Oct. 2007.

(Continued)

*Primary Examiner* — Steven H Nguyen
*Assistant Examiner* — Candal Elpenord
(74) *Attorney, Agent, or Firm* — Slater & Matsil, L.L.P.

(57) ABSTRACT

System and method for support multiple topology in Label Distribution Protocol of Multi-Protocol Label Switching (MPLS) network are disclosed. The system includes a number of network elements and a communication mechanism used to connect the network elements. The network elements discover LDP peers within the network topology, and create and maintain LDP sessions for each of the network topologies. The network elements further establish LSPs by mapping network layer routing information within each network topology to data link layer switches paths. Furthermore, the communication mechanism enables the network elements to advertise the multi-topology capability and exchange the mapping information of label and FECs within each network topology.

20 Claims, 17 Drawing Sheets

OTHER PUBLICATIONS

Przygienda, T. et al., "M-ISIS: Multi-Topology (MT) Routing in Intermediate System to Intermediate Systems (IS-ISs)," RFC 5120, The IETF Trust, 14 pages, Feb. 2008.

Psenak, P. et al., "Multi-Topology (MT) Routing in OSPF," RFC 4915, The IETF Trust, 19 pages, Jun. 2007.

Rosen, E. et al., "Multiprotocol Label Switching Architecture," RFC 3031, The Internet Society, 57 pages, Jan. 2001.

International Application No. PCT/CN2009/071571, International Search Report and Written Opinion, 7 pages, Aug. 6, 2009.

\* cited by examiner

| Topology Label | Network Topology |
|---|---|
| MT-ID 1 | Topology 1 |
| MT-ID 2 | Topology 2 |
| MT-ID 3 | Topology 3 |
| ... | ... |

| | | |
|---|---|---|
| IPv4 Prefix | MT Identifier 1 (12 Bits) | |
| MPLS Label 1 | MT Identifier 2 (12 Bits) | |
| MPLS Label 2 | MT Identifier 3 (12 Bits) | |

FIG. 16

SYSTEMS AND METHODS FOR IMPLEMENTING MULTI-TOPOLOGY SUPPORT FOR LABEL DISTRIBUTION PROTOCOL (LPD) OF A MULTIPROTOCOL LABEL SWITCHING NETWORK

PRIORITY CLAIM

This is a non-provisional application that claims priority to U.S. Provisional Application No. 61/048,937, entitled SYSTEM AND METHOD FOR MULTI-TOPOLOGY SUPPORT FOR LABEL DISTRIBUTION PROTOCOL OF A MULTIPROTOCOL LABEL SWITCHING NETWORK, filed on Apr. 29, 2008, and it is incorporated by reference in its entirety for any and all purposes.

FIELD OF THE INVENTION

The present invention relates generally to network communications, and more particularly, to multi-topology in multi-protocol label switching (MPLS) networks.

BACKGROUND OF THE INVENTION

Recently, there has been an increasing need to support multi-topology in Multi-Protocol Label Switching (MPLS) networks. For example, service providers may desire to assign different level of service(s) to different topologies such that service separation can be achieved in a more nature and simpler fashion. Further, MPLS networks typically include a set of building blocks to establish a label switching network where a point to point label switched path is used for forwarding traffic. In MPLS networks, a label is assigned to represent a set of Forwarding Equivalent Classes (FEC) of the packets, and the mapping of the label and the FEC is signaled along the path the packets travel, therefore the label switched path is established to forward packets.

In addition, the Label Distribution Protocol (LDP) includes a set of messages and procedures used by network elements to inform other network elements of labels to support MPLS forwarding along normally routed paths so that the traffic is forwarded among and through such paths. LDP distributes the mapping of network layer routing information directly to data link layer switched paths, and associates a FEC with a label switched path created. The FEC associated with an Label Switching Path (LSP) specifies which packets are mapped to the corresponding LSP.

Multi-Topology (MT) Routing in Open Shortest Path First (OSPF) describes a mechanism for OSPF protocols to support Multi-Topologies (MTs) in an IP network where the Type of Service (TOS) based metric fields are redefined and are used to advertise different topologies by advertising separate metrics for each topology. Furthermore, MT-IS-IS: Multi Topology (MT) Routing in Intermediate System to Intermediate Systems (IS-ISs) describes a mechanism within IS-ISs to run a set of independent IP topologies.

Accordingly, each of these existing protocols lack the necessary structure and capabilities to support MT in MPLS networks. Hence, there is a need to have systems and methods for supporting MT in MPLS networks and extending the LDP protocol as one of the signaling protocol in MPLS networks to establish and maintain LSP within each of the network topologies.

BRIEF SUMMARY OF THE INVENTION

Embodiments of the present invention provide improvements to the existing LDP protocol which is extended to consider network topology information. One enhancement to network elements for a discovery mechanism includes the ability for the network element to periodically send a LDP Link Hello message which includes additional information about the network topology in which the network elements participate. The hello message is sent to the routers group multicast address. Further, the network element can participate in multiple network topologies, where each interface can participate the different network topology. Accordingly, the Hello message from different interfaces for a given network element may include different network topology information depending on the membership of the specific interface to the topology.

Another enhancement to network elements for the discovery mechanism includes the ability for the network elements to receive the LDP Link Hello message, which includes network topology information that identifies a hello adjacency with a potential LDP peer which is reachable within the topology on the interface, as well as the label space in which the peer intends to use for the topology on the interface.

Yet another enhancement to the network elements for the discovery mechanism includes a mechanism for the network elements to periodically send LDP Targeted Hello messages. Such messages include additional information about the network topology for which the network element participates. The targeted hello message is sent to the specific address of a peer, and the network element can participate in multiple network topologies.

A further enhancement to the network elements for the discovery mechanism includes the ability for the network elements to receive a LDP Targeted Hello message, which includes network topology information that identifies a hello adjacency with a potential LDP peer which is reachable within the topology on the interface, as well as the label space the peer intends to use for the topology on the interface.

Yet a further enhancement to the network elements to establish a LDP session includes the ability for the network elements to create and maintain one LDP session for all network topologies. In one embodiment, this means that the network elements create and maintain one TCP session for all network topologies in which the network element is a participant. The TCP session may be established using the source address, destination address, source port, and destination port. Furthermore, the network elements include network topology information in an Initialization message. The Initialization message is exchanged as part of the LDP session establishment procedures.

An additional enhancement to the network elements to establish LDP session includes the ability for the network elements to receive the Initialization message which includes the network topology information. This information can be used, along with other information (e.g., the LDP identifier), to match the Initialization message with one of its Hello adjacency. If the Hello adjacency and the Initialization message do not match, then the network element sends a session rejection message in response to the Initialization message. As such, the LDP session cannot be established. If the Hello adjacency and the Initialization message do match, then an acknowledgement response is sent and the LDP session can be established.

Another enhancement to the network elements to maintain a LDP session includes the ability for the network elements to send KeepAlive messages which include network topology information, when a LDP session is established for each network topology. The KeepAlive message may be provided to allow the resetting of the KeepAlive message's timer of the session for the network topology in the case where the network element does not have other communication to its peers on the topology. Further, each time a LDP message is received on the session for the network topology, the session KeepAlive timer is reset.

Yet another enhancement to a network element to maintain a LDP session includes the ability for the network element to send and receive a Shutdown message with the network topology information. The LDP session is associated with a TCP session. When the network element leaves the LDP session all the network elements leave the LDP session and the TCP session associated with the LDP session is closed.

An enhancement to the communication mechanism among network elements includes the ability to negotiate the capability of multi-topology support during the establishment of a LDP session. In one embodiment, when the network element is able to support multi-topology, the corresponding capability bit is set in the Initialization message. In another embodiment, when the network element is unable to support multi-topology, the corresponding capability bit is reset in the Initialization message to indicate its lack of capability support. Then, when network element receives an Initialization message with the multi-topology support capability, the network element maintains the multi-topology support information for the peer and sends subsequent messages with corresponding multi-topology information. When a network element receives an Initialization message without multi-topology support capability, the network element sends subsequent messages without multi-topology information.

Furthermore, the communication mechanism among network elements include the ability to negotiate the capability of multi-topology support after the LDP session is established. In one embodiment, when the network element is able to support multi-topology, the corresponding capability bit is set in a LDP capability message. In another embodiment, when the network element is unable to support multi-topology, the corresponding capability bit is reset in the LDP Capability message to indicate its lack of capability support. When network element receives the Capability message indicating the newly supported multi-topology capability, the network element updates its multi-topology table for this peer and sends subsequent LDP messages with corresponding multi-topology information. If the network element receives a LDP capability message indicating its lack of support of multi-topology capability, the network element updates its multi-topology table for this peer and sends subsequent LDP messages without multi-topology information.

The communication mechanism among network elements is further enhanced by providing label distribution in an Address message. In one embodiment, the network element includes an Address message with multi-topology information so as to advertise its interface addresses and the topology the interface belongs to. Further, label distribution in an Address Withdraw message may be performed. In one embodiment, the network element includes an Address Withdraw message with multi-topology information to withdraw its previously advertised interface addresses and the topology the interface belongs to.

A further enhancement to the communication mechanism among network elements includes label distribution in a Label Mapping message. In one embodiment, the network element includes a Label Mapping message with multi-topology information to advertise to its peer the mapping of FEC and label on the network topology. Furthermore, an enhancement to the communication mechanism among network elements includes label distribution in a Label Request message. In one embodiment, the network element includes a Label Request message with multi-topology information to its peer to request a label binding for a FEC on the network topology. In addition, label distribution in a Label Abort Request message may be implemented. In one embodiment, the network element includes a Label Abort Request message with multi-topology information to abort to its peer an outstanding label request message.

Additional enhancements to the communication mechanism among network elements includes the ability for label distribution in a Label Withdraw message. In one embodiment, the network element includes a Label Withdraw message with multi-topology information to signal its peer that it does not want to continue using the specific mapping of FEC to label the network topology which it has previously advertised. In a further embodiment, the network element includes a Label Release message with multi-topology information to signal its peer that it does not need the specific mapping of FEC to label for the network topology which it has previously requested and/or advertised. In yet a further embodiment, the network element includes a Notification message with multi-topology information to inform its peer of a significant event for the topology. Such a message signals a fatal error and/or provides advisory information of processing a LDP message and the state of the LDP session for the topology.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sublabel is associated with a reference numeral to denote one of multiple similar components. When reference is made to a reference numeral without specification to an existing sublabel, it is intended to refer to all such multiple similar components.

FIG. 16 is an illustration of one embodiment of overlapping label spaces for MT with extend label length, in accordance with various embodiments of the invention.

DETAILED DESCRIPTION OF THE INVENTION

The following discussion is presented to enable a person skilled in the art to make and use the invention. The general principles described herein may be applied to embodiments and applications other than those detailed below without departing from the spirit and scope of the present invention as defined herein. The present invention is not intended to be limited to the embodiments shown, but is to be accorded the widest scope consistent with the principles and features disclosed herein.

The present invention provides various embodiments that disclose versatile systems and methods for support multi-topology in MPLS network using Label Distribution Protocol (LDP). Certain embodiments of the invention comprise a number of enhancements to the existing system and method for LDP peer discovery, LDP session creation and maintenance to support multi-topology and the enhancements to the communication mechanism between network elements when a label switched path (LSP) is established within the topology.

Figure 1:
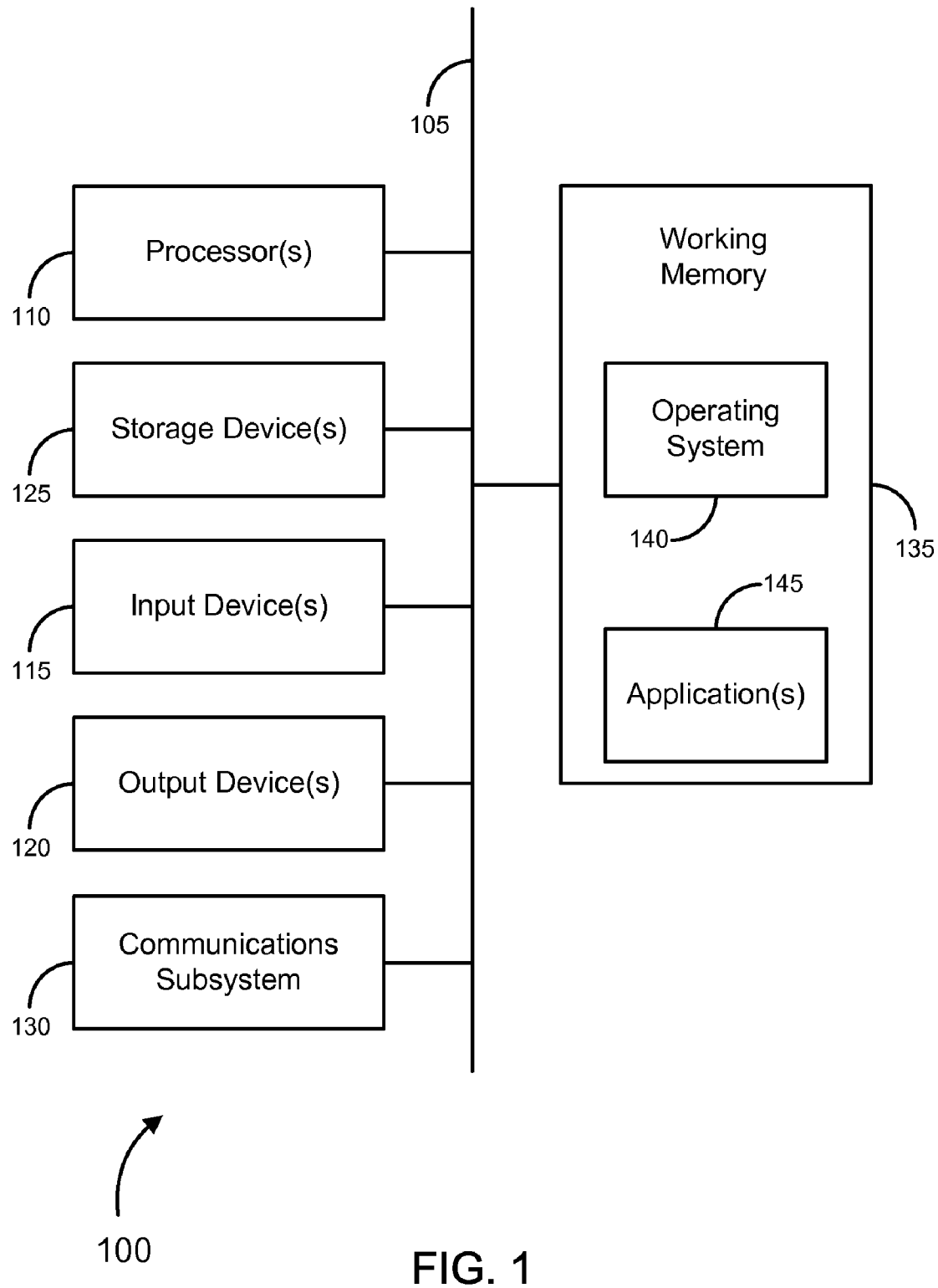
FIG. 1 is a generalized schematic diagram illustrating a computer system, in accordance with various embodiments of the invention.
Figure 3:
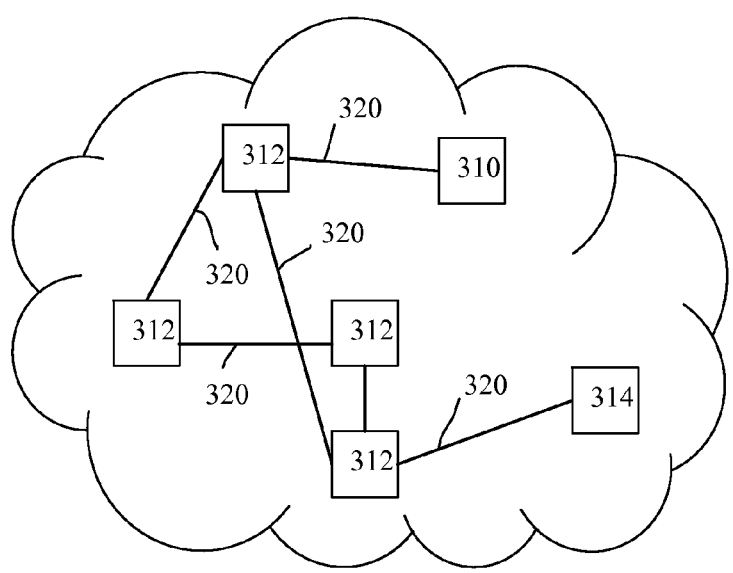
FIG. 3 is a schematic diagram of an embodiment of a packet switched network, in accordance with various embodiments of the invention.

FIG. 1 provides a schematic illustration of one embodiment of a computer system 400 that can perform the methods of the invention, as described herein, and/or can function as, for example, ingress node 310, transit node 312, or egress node 314 (FIG. 3). It should be noted that FIG. 1 is meant only to provide a generalized illustration of various components, any or all of which may be utilized as appropriate. FIG. 1, therefore, broadly illustrates how individual system elements may be implemented in a relatively separated or relatively more integrated manner.

The computer system 100 is shown comprising hardware elements that can be electrically coupled via a bus 105 (or may otherwise be in communication, as appropriate). The hardware elements can include one or more processors 110, including without limitation one or more general-purpose processors and/or one or more special-purpose processors (such as digital signal processing chips, graphics acceleration chips, and/or the like); one or more input devices 115, which can include without limitation a mouse, a keyboard and/or the like; and one or more output devices 120, which can include without limitation a display device, a printer and/or the like.

The computer system 100 may further include (and/or be in communication with) one or more storage devices 125, which can comprise, without limitation, local and/or network accessible storage and/or can include, without limitation, a disk drive, a drive array, an optical storage device, a solid-state storage device, such as a random access memory ("RAM") and/or a read-only memory ("ROM"), which can be programmable, flash-updateable and/or the like. The computer system 100 might also include a communications subsystem 130, which can include without limitation a modem, a network card (wireless or wired), an infra-red communication device, a wireless communication device and/or chipset (such as a Bluetooth™ device, an 802.11 device, a WiFi device, a WiMax device, cellular communication facilities, etc.), and/or the like. The communications subsystem 130 may permit data to be exchanged with a network (such as the network described below, to name one example), and/or any other devices described herein. In many embodiments, the computer system 100 will further comprise a working memory 135, which can include a RAM or ROM device, as described above.

The computer system 100 also can comprise software elements, shown as being currently located within the working memory 135, including an operating system 140 and/or other code, such as one or more application programs 145, which may comprise computer programs of the invention, and/or may be designed to implement methods of the invention and/or configure systems of the invention, as described herein. Merely by way of example, one or more procedures described with respect to the method(s) discussed above might be implemented as code and/or instructions executable by a computer (and/or a processor within a computer). A set of these instructions and/or code might be stored on a computer readable storage medium, such as the storage device(s) 125 described above. In some cases, the storage medium might be incorporated within a computer system, such as the system 100. In other embodiments, the storage medium might be separate from a computer system (e.g., a removable medium, such as a compact disc, etc.), and or provided in an installation package, such that the storage medium can be used to program a general purpose computer with the instructions/code stored thereon. These instructions might take the form of executable code, which is executable by the computer system 100 and/or might take the form of source and/or installable code, which, upon compilation and/or installation on the computer system 100 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

In one aspect, the invention employs a computer system (such as the computer system 100) to perform methods of the invention. According to a set of embodiments, some or all of the procedures of such methods are performed by the computer system 100 in response to processor 110 executing one or more sequences of one or more instructions (which might be incorporated into the operating system 140 and/or other code, such as an application program 145) contained in the working memory 135. Such instructions may be read into the working memory 135 from another machine-readable medium, such as one or more of the storage device(s) 125. Merely by way of example, execution of the sequences of instructions contained in the working memory 135 might cause the processor(s) 110 to perform one or more procedures of the methods described herein.

The terms "machine-readable medium" and "computer readable medium", as used herein, refer to any medium that participates in providing data that causes a machine to operate in a specific fashion. In an embodiment implemented using the computer system 100, various machine-readable media might be involved in providing instructions/code to processor(s) 110 for execution and/or might be used to store and/or carry such instructions/code (e.g., as signals). In many implementations, a computer readable medium is a physical and/or tangible storage medium. Such a medium may take many forms, including but not limited to, non-volatile media, volatile media, and transmission media. Non-volatile media includes, for example, optical or magnetic disks, such as the storage device(s) 125. Volatile media includes, without limitation, dynamic memory, such as the working memory 135. Transmission media includes coaxial cables, copper wire and fiber optics, including the wires that comprise the bus 105, as well as the various components of the communication subsystem 130 (and/or the media by which the communications subsystem 130 provides communication with other devices). Hence, transmission media can also take the form of waves (including without limitation radio, acoustic and/or light waves, such as those generated during radio-wave and infra-red data communications).

Common forms of physical and/or tangible computer readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, any other memory chip or cartridge, a carrier wave as described hereinafter, or any other medium from which a computer can read instructions and/or code.

Various forms of machine-readable media may be involved in carrying one or more sequences of one or more instructions to the processor(s) 110 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 100. These signals, which might be in the form of electromagnetic signals, acoustic signals, optical signals and/or the like, are all examples of carrier waves on which instructions can be encoded, in accordance with various embodiments of the invention.

The communications subsystem 130 (and/or components thereof) generally will receive the signals, and the bus 105 then might carry the signals (and/or the data, instructions, etc., carried by the signals) to the working memory 135, from which the processor(s) 105 retrieves and executes the instructions. The instructions received by the working memory 135 may optionally be stored on a storage device 125 either before or after execution by the processor(s) 110.

Figure 2:
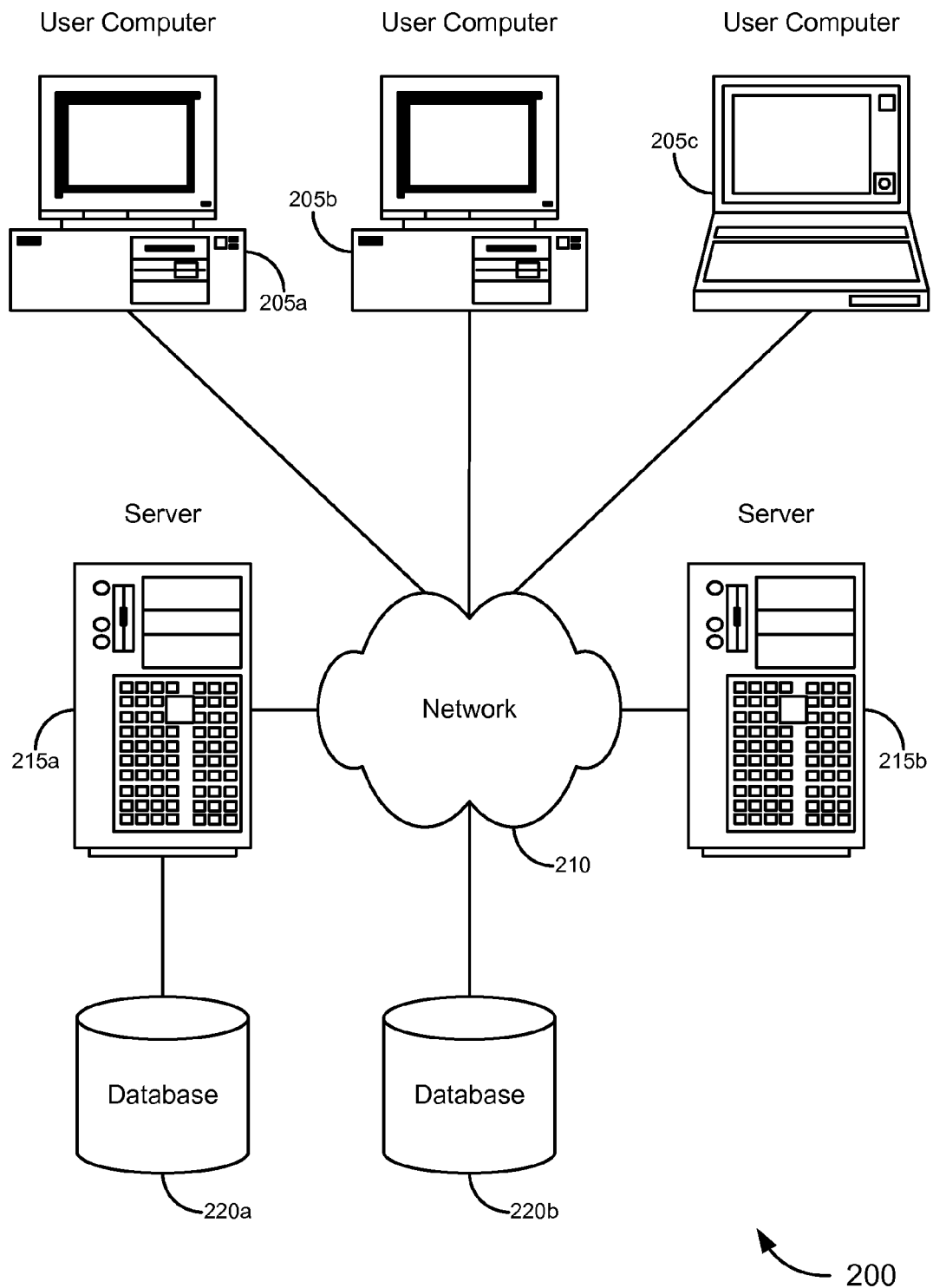
FIG. 2 is a block diagram illustrating a networked system of computers, which can be used in accordance with various embodiments of the invention.

A set of embodiments comprises systems for implementing multi-topology in MPLS networks. Merely by way of example, FIG. 2 illustrates a schematic diagram of a system 200 that can be used in accordance with one set of embodiments. The system 200 can include one or more user computers 205. The user computers 205 can be general purpose personal computers (including, merely by way of example, personal computers and/or laptop computers running any appropriate flavor of Microsoft Corp.'s Windows™ (e.g., Vista™) and/or Apple Corp.'s Macintosh™ operating systems) and/or workstation computers running any of a variety of commercially-available UNIX™ or UNIX-like operating systems. These user computers 205 can also have any of a variety of applications, including one or more applications configured to perform methods of the invention, as well as one or more office applications, database client and/or server applications, and web browser applications. Alternatively, the user computers 205 can be any other electronic device, such as a thin-client computer, Internet-enabled mobile telephone, and/or personal digital assistant (PDA), capable of communicating via a network (e.g., the network 210 described below) and/or displaying and navigating web pages or other types of electronic documents. Although the exemplary system 200 is shown with three user computers 205, any number of user computers can be supported.

Certain embodiments of the invention operate in a networked environment, which can include a network 210. The network 210 can be any type of network familiar to those skilled in the art that can support data communications using any of a variety of commercially-available protocols, including without limitation TCP/IP, SNA, IPX, AppleTalk, and the like. Merely by way of example, the network 210 can be a local area network ("LAN"), including without limitation an Ethernet network, a Token-Ring network and/or the like; a wide-area network (WAN); a virtual network, including without limitation a virtual private network ("VPN"); the Internet; an intranet; an extranet; a public switched telephone network ("PSTN"); an infra-red network; a wireless network, including without limitation a network operating under any of the IEEE 802.11 suite of protocols, the Bluetooth™ protocol known in the art, and/or any other wireless protocol; and/or any combination of these and/or other networks.

Embodiments of the invention can include one or more server computers 215. Each of the server computers 215 may be configured with an operating system, including without limitation any of those discussed above, as well as any commercially (or freely) available server operating systems. Each of the servers 215 may also be running one or more applications, which can be configured to provide services to one or more clients 205 and/or other servers 215.

Merely by way of example, one of the servers 215 may be a web server, which can be used, merely by way of example, to process requests for web pages or other electronic documents from user computers 205. The web server can also run a variety of server applications, including HTTP servers, FTP servers, CGI servers, database servers, Java™ servers, and the like. In some embodiments of the invention, the web server may be configured to serve web pages that can be operated within a web browser on one or more of the user computers 205 to perform methods of the invention.

The server computers 215, in some embodiments, might include one or more application servers, which can include one or more applications accessible by a client running on one or more of the client computers 205 and/or other servers 215. Merely by way of example, the server(s) 215 can be one or more general purpose computers capable of executing programs or scripts in response to the user computers 205 and/or other servers 215, including without limitation web applications (which might, in some cases, be configured to perform methods of the invention). Merely by way of example, a web application can be implemented as one or more scripts or programs written in any suitable programming language, such as Java™, C, C#™ or C++, and/or any scripting language, such as Perl, Python, or TCL, as well as combinations of any programming/scripting languages. The application server(s) can also include database servers, including without limitation those commercially available from Oracle™, Microsoft™, Sybase™, IBM™ and the like, which can process requests from clients (including, depending on the configuration, database clients, API clients, web browsers, etc.) running on a user computer 205 and/or another server 215. In some embodiments, an application server can create web pages dynamically for displaying the information in accordance with embodiments of the invention. Data provided by an application server may be formatted as web pages (comprising HTML, Javascript, etc., for example) and/or may be forwarded to a user computer 205 via a web server (as described above, for example). Similarly, a web server might receive web page requests and/or input data from a user computer 205 and/or forward the web page requests and/or input data to an application server. In some cases, a web server may be integrated with an application server.

In accordance with further embodiments, one or more servers 215 can function as a file server and/or can include one or more of the files (e.g., application code, data files, etc.) necessary to implement methods of the invention incorporated by an application running on a user computer 205 and/or another server 215. Alternatively, as those skilled in the art will appreciate, a file server can include all necessary files, allowing such an application to be invoked remotely by a user computer 205 and/or server 215. It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 220. The location of the database(s) 220 is discretionary: merely by way of example, a database 220*a* might reside on a storage medium local to (and/or resident in) a server 215*a* (and/or a user computer 205). Alternatively, a database 220*b* can be remote from any or all of the computers 205, 215, so long as the database can be in communication (e.g., via the network 210) with one or more of these. In a particular set of embodiments, a database 220 can reside in a storage-area network ("SAN") familiar to those skilled in the art. (Likewise, any necessary files for performing the functions attributed to the computers 205, 215 can be stored locally on the respective computer and/or remotely, as appropriate.) In one set of embodiments, the database 220 can be a relational database, such as an Oracle™ database, that is adapted to store, update, and retrieve data in response to SQL-formatted commands. The database might be controlled and/or maintained by a database server, as described above, for example.

FIG. 3 illustrates one embodiment of a packet switched network 300 where data traffic may be transported using packets and routed based on packet labels. For instance, the label packet switched network 300 may be a packet switched network, where data traffic may be transported using packets or frames along network paths or routes. The packets may be routed or switched along the paths established by a label switching protocol, such as MPLS or generalized MPLS (GMPLS). Accordingly, the packets may be routed at a hop-to-hop basis, where each hop may determine the next hop to forward the packet to. The packets correspond to a plurality of network topologies in the packet switched network 300. Each network topology may be characterized or defined by an arrangement of network components or network architecture, by means of communications or signaling protocols between the network components, or both. Each network topology may be assigned different quality of service (QoS), security restrictions, allocated bandwidth, IP addressing scheme, etc. Further, a plurality of packet types may be transported at each network topology, which may be associated with corresponding FECs.

The packet switched network 300 may comprise an ingress node 310, at least one transit node 312, and an egress node 314, which may be coupled to one another using optical, electrical, or wireless links 320. In other embodiments, the packet switched network 300 may also comprise a plurality of ingress nodes 310 and egress nodes 314. The ingress node 310, transit node 312, and egress node 314, may be any device, component, or network that may produce, receive, and/or transport data packets. For example, the ingress node 310, transit node 312, and egress node 314 may include bridges, switches, routers, or various combinations of such devices. The ingress node 310, transit node 312, and egress node 314 may each comprise a plurality of ingress ports for receiving packets from other nodes, logic circuitry to determine which node to forward the packets to, and a plurality of egress ports for transmitting packets to other nodes.

In an embodiment, the transit nodes 312 may be a label switched routers (LSRs), which may be configured to modify the labels in the transported packets. The ingress node 310 and egress node 314 may be label edge routers (LERs), for example at the edges of the packet switched network 300, which may be configured to insert or remove the labels in the packets transported between the packet switched network 300 and external networks. The ingress node 310 and egress node 314 may be the source node and the destination node, respectively, in the packet switched network 300 along a label switched path (LSP), which may include some of the transit nodes 312.

In an embodiment, the ingress node 310 may receive a packet corresponding to one of the network topologies and tag the packet to indicate its network topology. Specifically, the ingress node 310 may assign a topology label for each network topology, which may be stored in a topology-to-label mapping table at the ingress node 310. Alternatively, the topology-to-label mapping table may be stored at another network component, which may be coupled to the ingress node 310, such as another node or server. To indicate the network topology of the packet, the ingress node 310 may add to the packet the topology label in the topology-to-label mapping table that corresponds to the network topology.

Additionally, the ingress node 310 may assign a next hop label for routing each FEC associated with each packet type, which may be stored in a FEC-to-NHLFE mapping table for each network topology at the ingress node 310 or may be accessible to the ingress node 310. As such, the quantity of stored FEC-to-NHLFE mapping tables may be equal to the quantity of network topologies in the packet switched network 300. The ingress node 310 may also add to the packet the next hop label in the FEC-to-NHLFE mapping table that corresponds to the packet FEC and network topology. The next hop label may be used to indicate the next hop to forward the packet to along the path. For instance, each next hop label may be assigned to or associated with one transit node 312, which may be determined based on some routing algorithm or protocol.

Accordingly, after processing the packet at the ingress node 310, the packet may comprise the topology label that indicates the network topology for the packet and the next hop label that indicates the next hop and FEC of the packet for that topology. In an embodiment, the topology label may be a top label added at the top of the packet and the next hop label may be an inner label added below the topology label, such that the topology label may be detected first at the next hop. The ingress node 310 may then forward the packet to the next hop, e.g., the transit node 312.

In an embodiment, the transit node 312 may receive the packet from the ingress node 310 or from another transit node 312. To determine the network topology of the packet, the transit node 312 may detect the topology label of the packet. The transit node 312 may obtain the set of topology labels in the packet switched network 300, for instance from the topology-to-label mapping table at the ingress node 310 or from a copy of the topology-to-label mapping table, which may be maintained at the transit node 312. The transit node 312 may match the received topology label with an entry in the topology-to-label mapping table to obtain the associated network topology.

Additionally, the transit node 312 may assign a next hop label for each received inner label. The next hop label may indicate the next hop to forward the packet to along the path, such as a next transit node 312 or egress node 314, which may be determined using the routing algorithm or protocol. This information may be stored in an incoming label mapping table for each network topology at the transit node 312 or may be accessible to the transit node 312. As such, the quantity of stored incoming label mapping tables may be equal to the quantity of network topologies in the packet switched network 300. Since the received inner label corresponds to a packet FEC or type, the transit node 312 may determine the packet FEC based on the received inner label, for instance by accessing the FEC-to-NHLFE mapping table for that topology at the ingress node 310 or obtaining the FEC mapping information from the previous hop. After determining the network topology and the packet FEC, the transit node 312 may replace the inner label in the received packet with the corresponding next hop label in the incoming label mapping table that corresponds to the packet FEC and network topology.

Accordingly, after processing the packet at the transit node 312, the packet may comprise the same top label or topology label that indicates the network topology and a new inner label that indicates the next hop and FEC of the packet for that topology. The transit node 312 may then forward the packet to the next hop, e.g., the next transit node 312 or the egress node 314.

In an embodiment, the egress node 314 may receive the packet from the transit node 312 or the ingress node 310 and determine the network topology of the packet based on the packet's top label. The egress node 314 may obtain the set of topology labels in the packet switched network 300 from the topology-to-label mapping table at the ingress node 310 or from a copy of the topology-to-label mapping table, which may be maintained at the egress node 314.

Additionally, the egress node 314 may determine the packet FEC or type based on the received inner label, for instance by obtaining the FEC mapping information from the previous hop. After determining the network topology and the packet FEC, the transit node 312 may remove the inner label, the top label, or both from the packet. The egress node 314 may then pass the packet to the corresponding service and/or application for the packet type in the network topology.

In an embodiment, the ingress node 310, the transit node 312, and the egress node 314 may negotiate their corresponding capabilities to support MT for MPLS in the packet switched network 300. For instance, if the ingress node 310, the transit node 312, or egress node 314 supports MT, it may send a message to at least one adjacent or neighboring node to inform the node of this capability. In some embodiments, the ingress node 310, the transit node 312, or egress node 314 supports MT, and may advertise this capability to all the other nodes in the packet switched network 300. For example, the message may comprise a bit, which may be set to indicate that the ingress node 310, the transit node 312, or egress node 314 supports MT in the MPLS network or may be cleared to indicate that it does not support MT in the MPLS network. Further, the ingress node 310, the transit node 312, or egress node 314 may forward its MT capability related information or exchange similar information with another node that also supports MT, for example after initially indicating their MT support capability.

In an embodiment, the ingress node 310, the transit node 312, or egress node 314 may forward or exchange the network topology mapping information with at least some of the remaining nodes, for example after negotiating their MT support capabilities. In some cases, the information may be forwarded or exchanged based on a request from another node. Accordingly, the ingress node 310, the transit node 312, or egress node 314 may forward the stored topology-to-label mapping table or the entries in the table to the neighboring node. For instance, the ingress node 310, the transit node 312, or egress node 314 may send a message or an object in the message, which may comprise such mapping information. The message or object may be sent with the forwarded packet from one hop to the next hop along the path. When the node receives the network topology mapping information, the node may maintain or update a mapping table comprising such information.

In an embodiment, the ingress node 310, the transit node 312, or egress node 314 may forward or exchange the FEC mapping information for each network topology with at least some of the remaining nodes, for example after forwarding or exchanging their network topology mapping information. The information may also be forwarded or exchanged based on a request from another node. Accordingly, the ingress node 310, the transit node 312, or egress node 314 may forward to the neighboring node the stored FEC-to-NHLFE mapping table, the incoming label mapping table, or the entries in such tables for each network topology. For instance, the ingress node 310, the transit node 312, or egress node 314 may send a message or an object in the message, which may comprise such mapping information. The message or object may be sent with the forwarded packet from one hop to the next hop along the path. When the node receives the FEC mapping information, the node may maintain or update a mapping table comprising such information.

In an embodiment, when a new ingress node 310, transit node 312, or egress node 314 joins a network topology in the packet switched network 300, it may advertise to the neighboring nodes or remaining nodes in the network topology its FEC mapping information for the network topology. The other nodes may receive such information, compare the information with their local information, and update accordingly the new node's information. The other nodes may also forward such information to other neighboring nodes. Further, when an ingress node 310, transit node 312, or egress node 314 leaves the network topology, it may advertise to the neighboring nodes or remaining nodes in the network topology that it withdraws its previously advertised FEC mapping information for the network topology, for example by sending a withdrawal message to the other nodes. The other nodes may receive the withdrawal message and update their local information accordingly. The other nodes may also forward the withdrawal message to other neighboring nodes.

Figure 4:
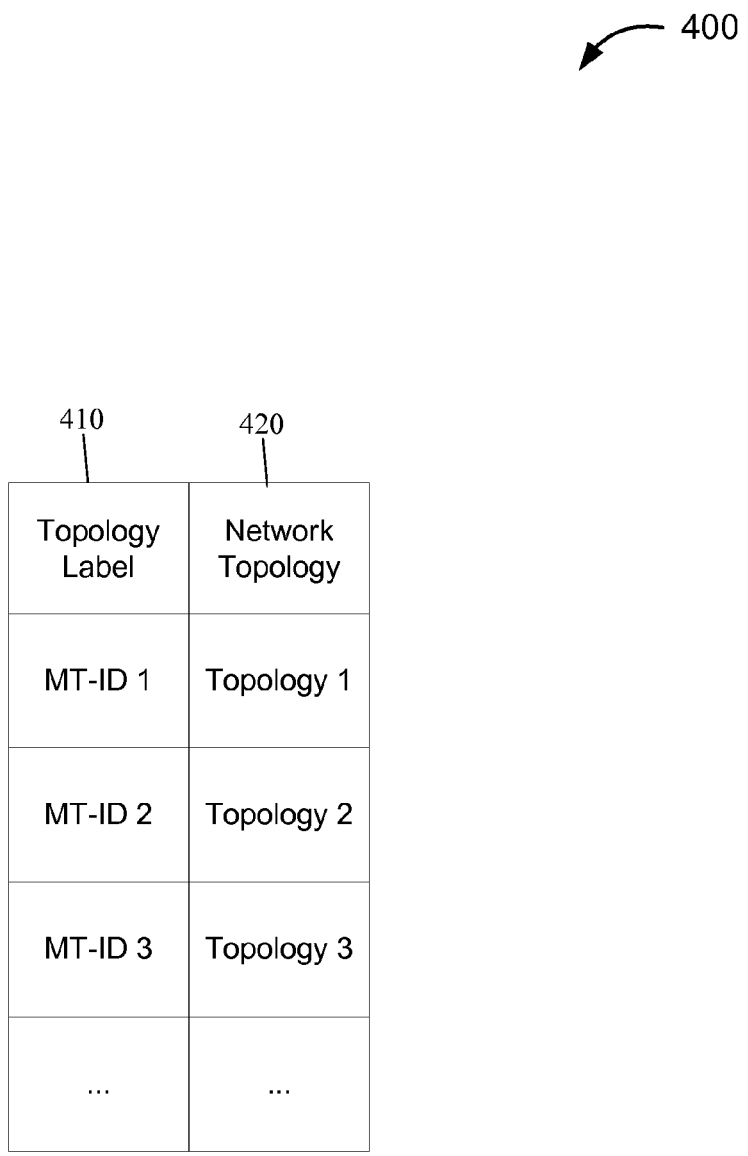
FIG. 4 is an illustration of an embodiment of a topology-to-label mapping table, in accordance with various embodiments of the invention.

FIG. 4 illustrates an embodiment of a topology-to-label mapping table 400 that may comprise the network topologies and the assigned label. Specifically, the topology-to-label mapping table 400 may comprise a topology label column 410 and a network topology column 420. The topology label column 410 may list the assigned labels corresponding to the network topologies. In an embodiment, the label assigned to each network topology may be a unique MT-Identifier (MT-ID), which may be different for each network topology. The network topology column 420 may list the network topologies in a packet based network or MPLS network. Thus, the rows within the topology-to-label mapping table 400 may indicate the assigned topology label associated with each network topology in the network.

Figure 5:
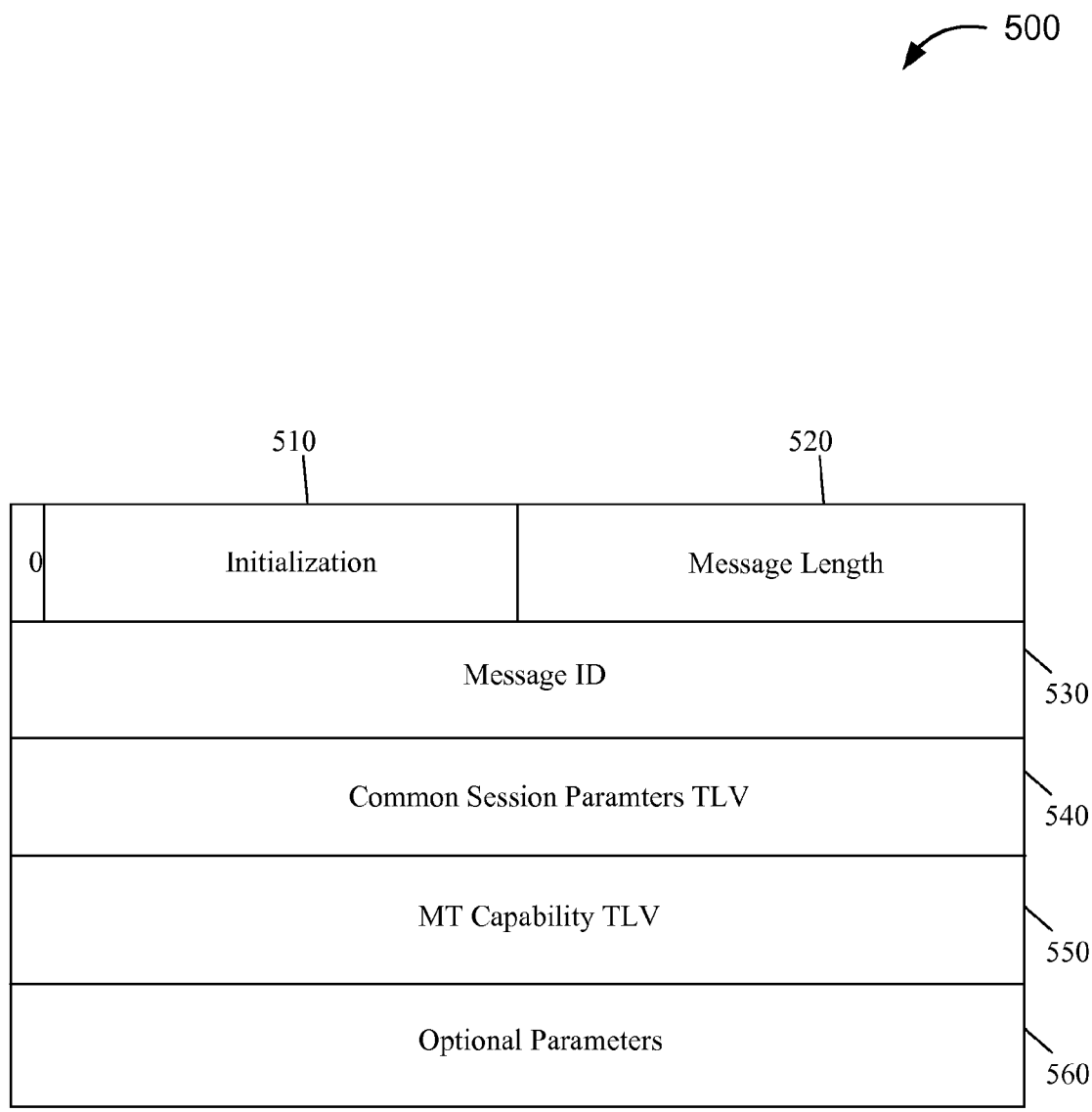
FIG. 5 is an illustration of one embodiment of a session initialization message, in accordance with various embodiments of the invention.

FIG. 5 is an embodiment of a session initialization message 500, which may be used to initiate a session between two neighboring nodes, such as between any of the ingress node 310, transit nodes 312, or egress node 314. For instance, the session initialization message 500 may be sent to initiate MT capability negotiation, topology mapping exchange, or FEC mapping exchange. The session initialization message 500 may comprise an initialization header 510, a message length 520, a message ID 530, a common session parameters TLV 540, and a MT capability TLV 550. Additionally, the session initialization message 500 may comprise other optional parameters 560. In an embodiment, the initialization header 510 may have a length of about 15 bits, the message length 520 may have a length of about 16 bits, and the message ID 530 may have a length of about 32 bits.

In an embodiment, the initialization header 510 may be assigned a specific type value (e.g., 0x0200) to indicate an initialization session message, the message length 520 may specify the length of the session initialization message 500 in bits or bytes, and the message ID 530 may indicate a unique ID associated with the session initialization message 500. Additionally, the common session parameters TLV 540 may specify information related to establish the session between two neighboring nodes and the MT capability TLV 550 may specify MT capability related information, as described in detail below.

Figure 6:
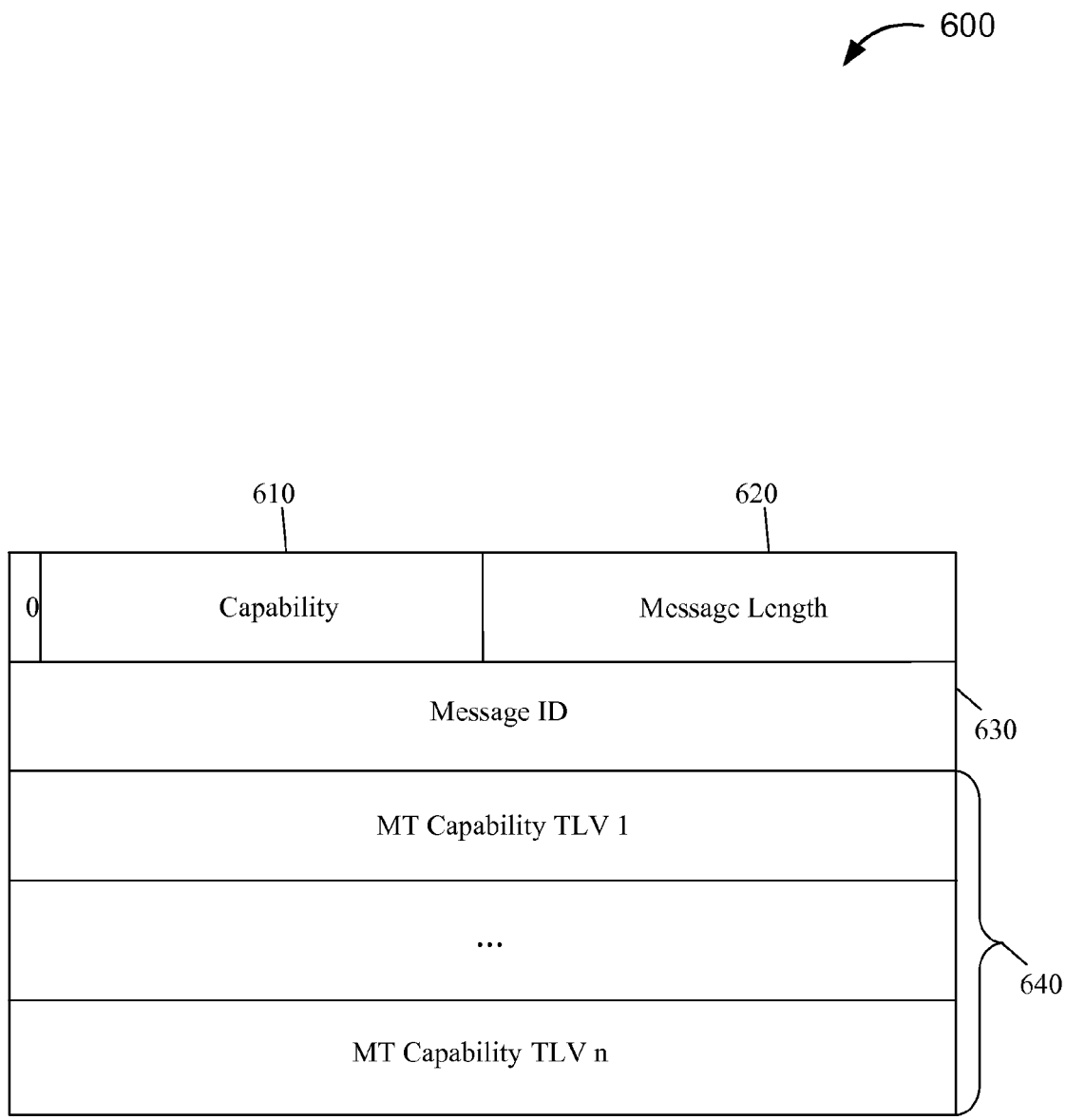
FIG. 6 is an illustration of one embodiment of a capability message, in accordance with various embodiments of the invention.

FIG. 6 is an embodiment of a capability message 600, which may be used to indicate the capability for supporting MT in MPLS networks, for example after a session initialization between two nodes. The capability message 600 may comprise a capability header 610, a message length 620, a message ID 630, and at least one MT capability TLV 640. The capability header 610, which may have a length equal to about 15 bits, may be assigned a specific type value to indicate a capability message. The remaining fields of the capability message 600 may be substantially similar to the corresponding fields of the session initialization message 500.

Figure 7:
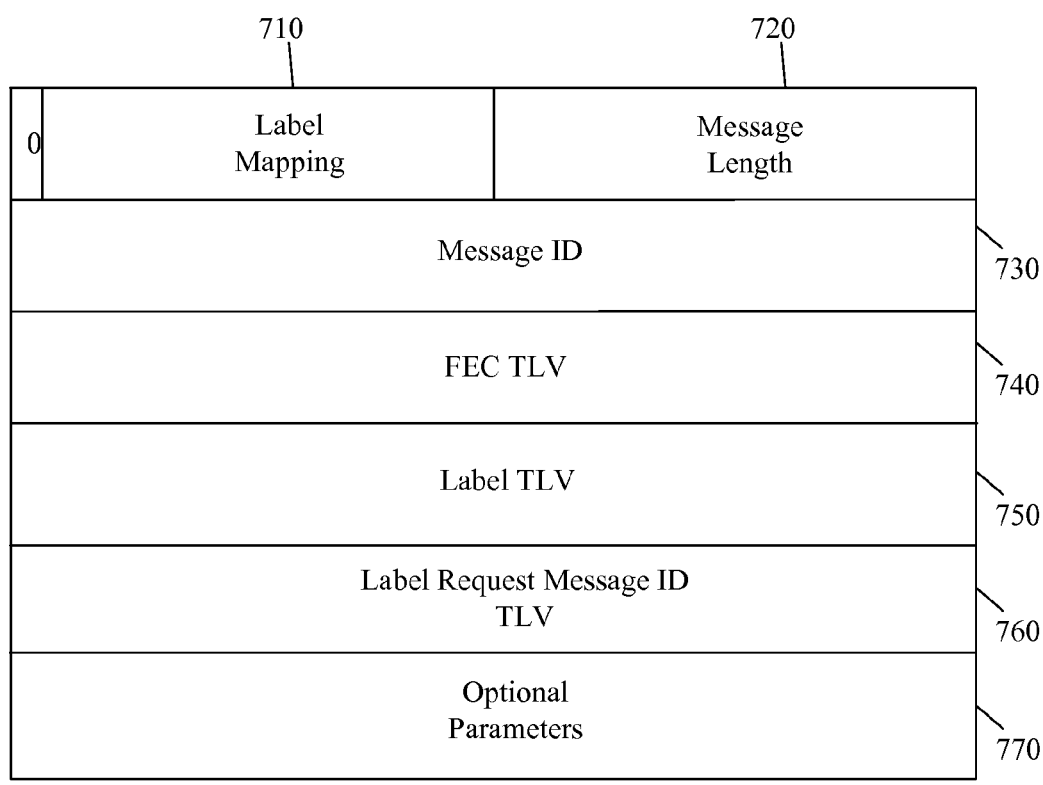
FIG. 7 is an illustration of one embodiment of a label mapping message, in accordance with various embodiments of the invention.

FIG. 7 is an embodiment of a label mapping message 700, which may be used to send topology or label mapping information between two neighboring nodes. The label mapping message 700 may comprise a label mapping header 710, a message length 720, a message ID 730, a FEC TLV 740, a label TLV 750, and a label request message ID TLV 760. Additionally, the label mapping message 700 may comprise other optional parameters 770. In an embodiment, the label mapping header 710 may have a length of about 15 bits, the message length 720 may have a length of about 16 bits, and the message ID 730 may have a length of about 32 bits.

In an embodiment, the label mapping header 710 may be assigned a specific type value (e.g., 0x0400) to indicate a label mapping message, the message length 720 may specify the length of the label mapping message 700 in bits or bytes, and the message ID 730 may indicate a unique ID associated with the label mapping message 700. Additionally, the FEC TLV 740 may specify the FECs that correspond to one network topology, the label TLV 750 may specify the next hop labels or the inner labels associated with the FEC TLV 740.

Figure 8:
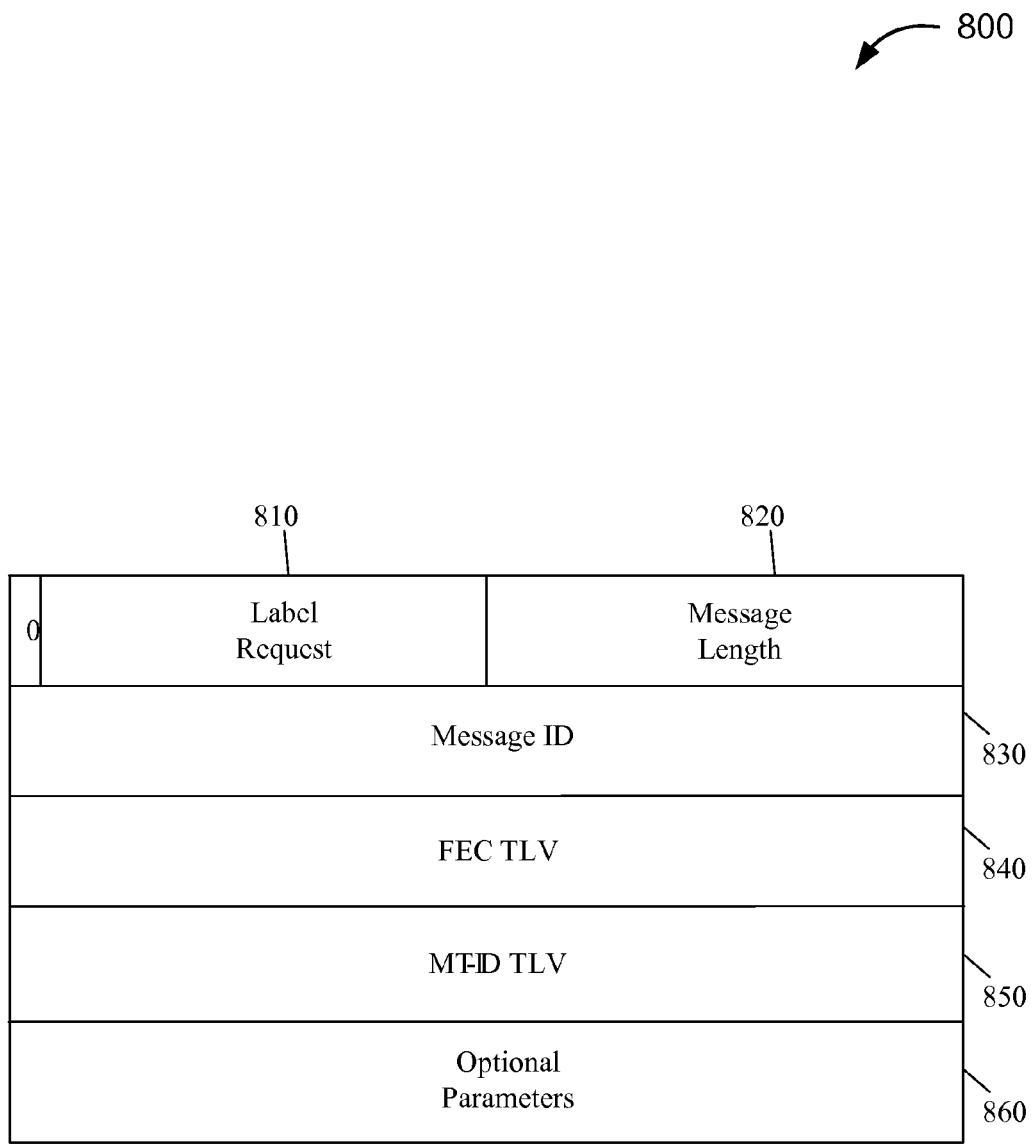
FIG. 8 is an illustration of one embodiment of a label request message, in accordance with various embodiments of the invention.

FIG. 8 is an embodiment of a label request message 800, which may be used to request topology or label mapping between two neighboring nodes. The label request message 800 may comprise a label request header 810, a message length 820, a message ID 830, a FEC TLV 840, and a MT-ID TLV 850. Additionally, the label request message 800 may comprise other optional parameters 860. In an embodiment, the label request header 810, which may have a length equal to about 15 bits, may be assigned a specific type value (e.g., 0x0401) to indicate a label request message. The remaining fields of the label request message 800 may be substantially similar to the corresponding fields of the label mapping message 700.

Figure 9:
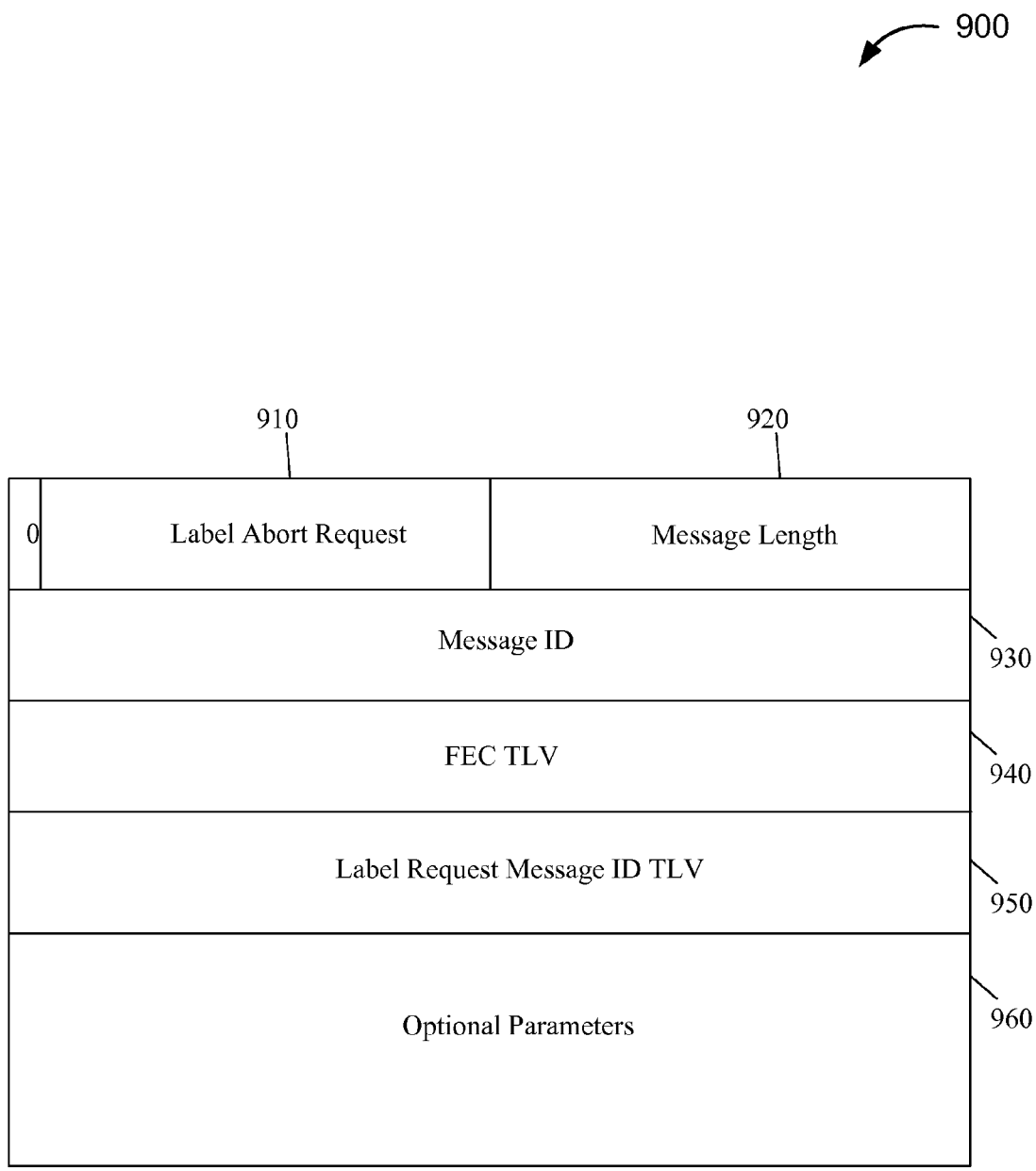
FIG. 9 is an illustration of one embodiment of a label abort request message, in accordance with various embodiments of the invention.

FIG. 9 is an embodiment of a label abort request message 900, which may be used to abort a transmitted topology or label mapping request between two neighboring nodes. The label abort message 900 may comprise a label abort request header 910, a message length 920, a message ID 930, a FEC TLV 940, and a label request message ID TLV 950. Additionally, the label abort request message 900 may comprise other optional parameters 960. The label abort request header 910, which may have a length equal to about 15 bits, may be assigned a specific type value (e.g., 0x0404) to indicate a label abort request message. The label request message ID TLV 950 may specify the message ID of the transmitted label request message to be aborted. The remaining fields of the label abort request message 900 may be substantially similar to the corresponding fields of the label mapping message 700.

Figure 10:
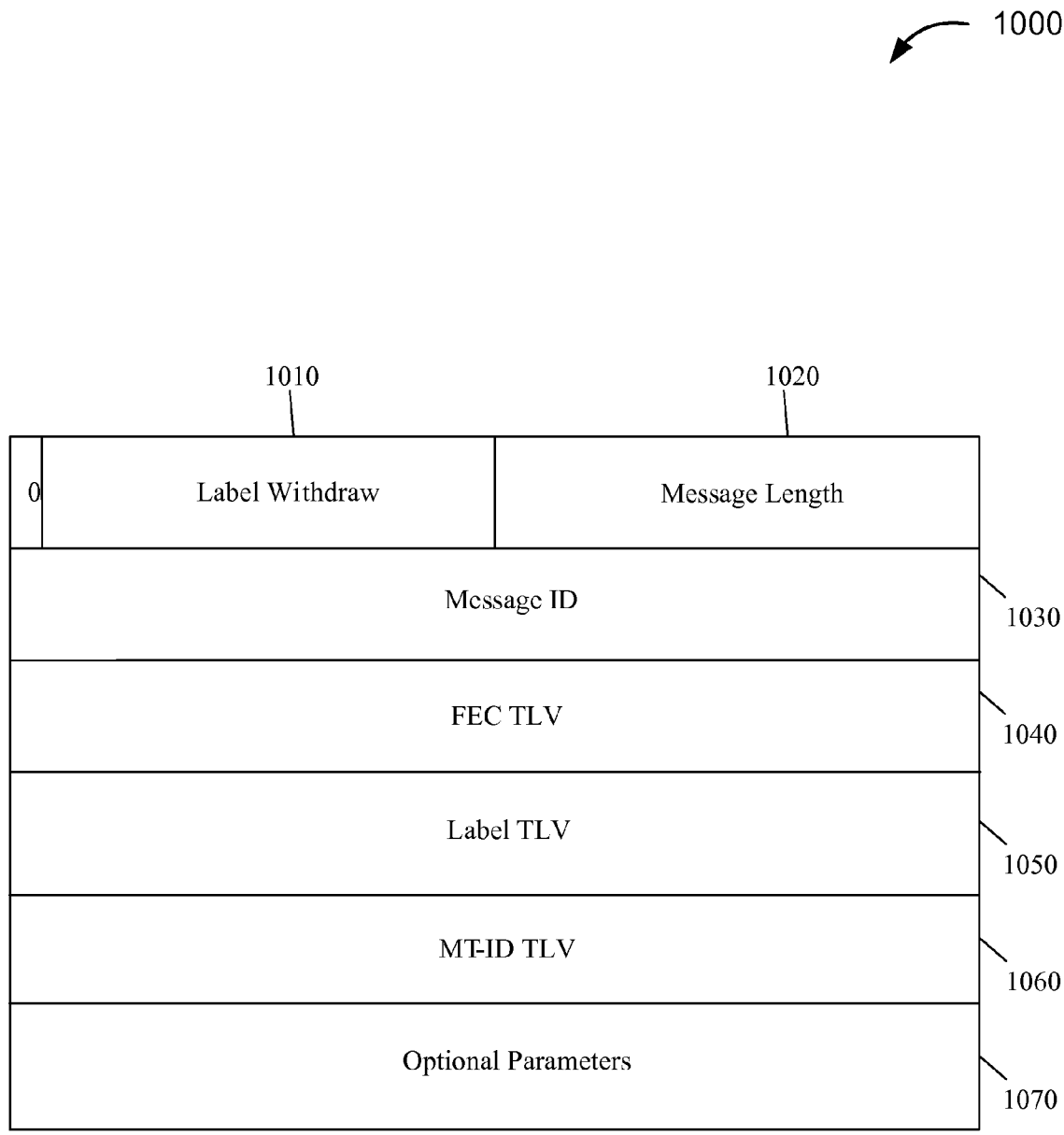
FIG. 10 is an illustration of one embodiment of a label withdraw message, in accordance with various embodiments of the invention.

FIG. 10 is an embodiment of a label withdraw message 1000, which may be used to withdraw previously advertised label mapping information or other mapping information, for example when a node leaves the network topology. The label withdraw message 1000 may comprise a label withdraw header 1010, a message length 1020, a message ID 1030, a FEC TLV 1040, and a MT-ID TLV 1060. Additionally, the label withdraw message 1000 may comprise an optional label TLV 1050 and/or other optional parameters 1070. The label withdraw header 1010, which may have a length equal to about 15 bits, may be assigned a specific type value (e.g., 0x0402) to indicate a label withdraw message. The remaining fields of the label withdraw message 1000 may be substantially similar to the corresponding fields of the label mapping message 700.

Figure 11:
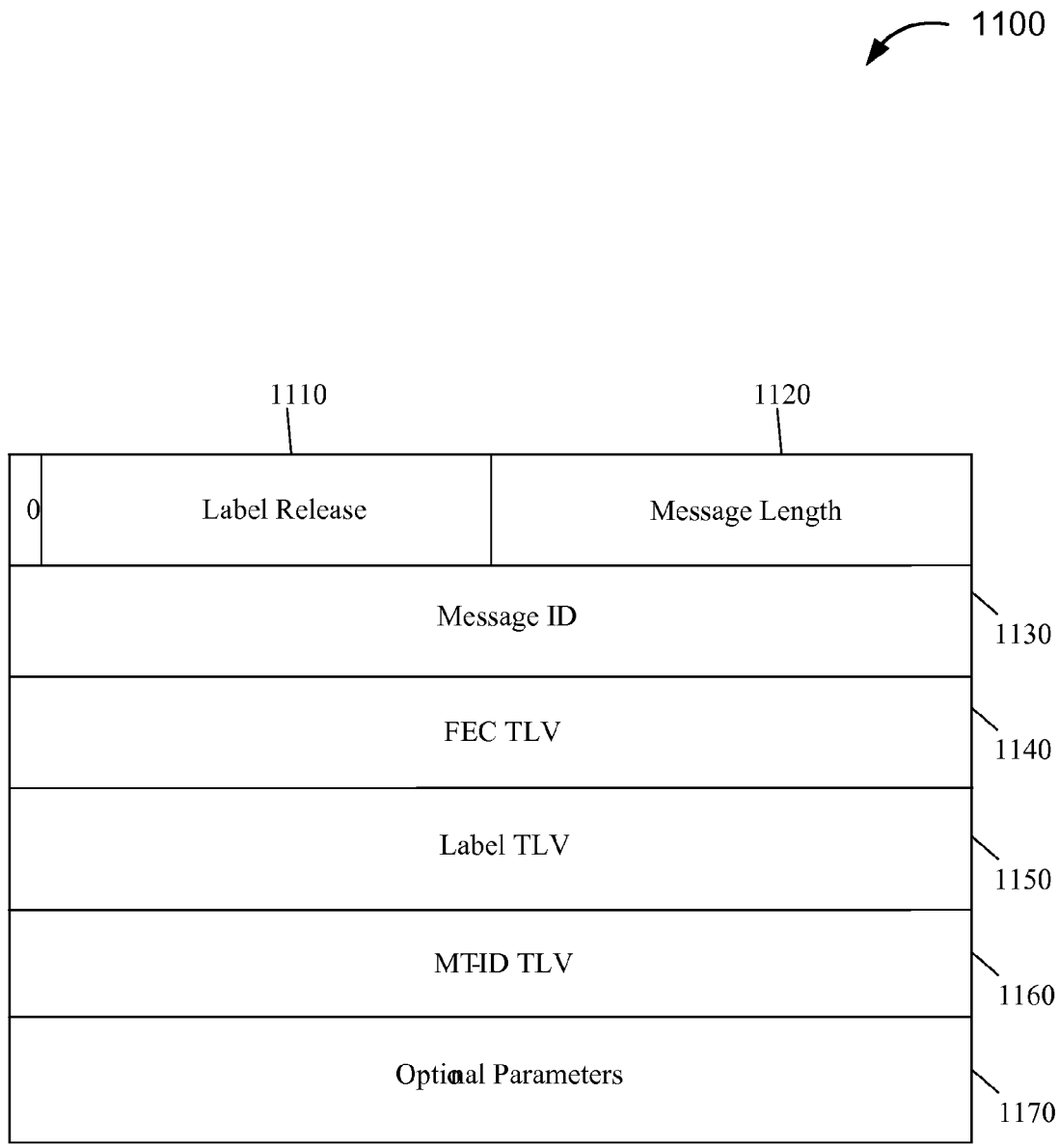
FIG. 11 is an illustration of one embodiment of a label release message, in accordance with various embodiments of the invention.

FIG. 11 is an embodiment of a label release message 1100, which may be used to release the previously advertised or requested label mapping information or other mapping information, for example when a node leaves the network topology. The label release message 1100 may comprise a label release header 1110, a message length 1120, a message ID 1130, a FEC TLV 1140, and a MT-ID TLV 1160. Additionally, the label release message 1100 may comprise an optional label TLV 1150 and/or other optional parameters 1170. The label release header 1110, which may have a length equal to about 15 bits, may be assigned a specific type value (e.g., 0x0403) to indicate a label release message. The remaining fields of the label release message 1100 may be substantially similar to the corresponding fields of the label mapping message 700.

Figure 12:
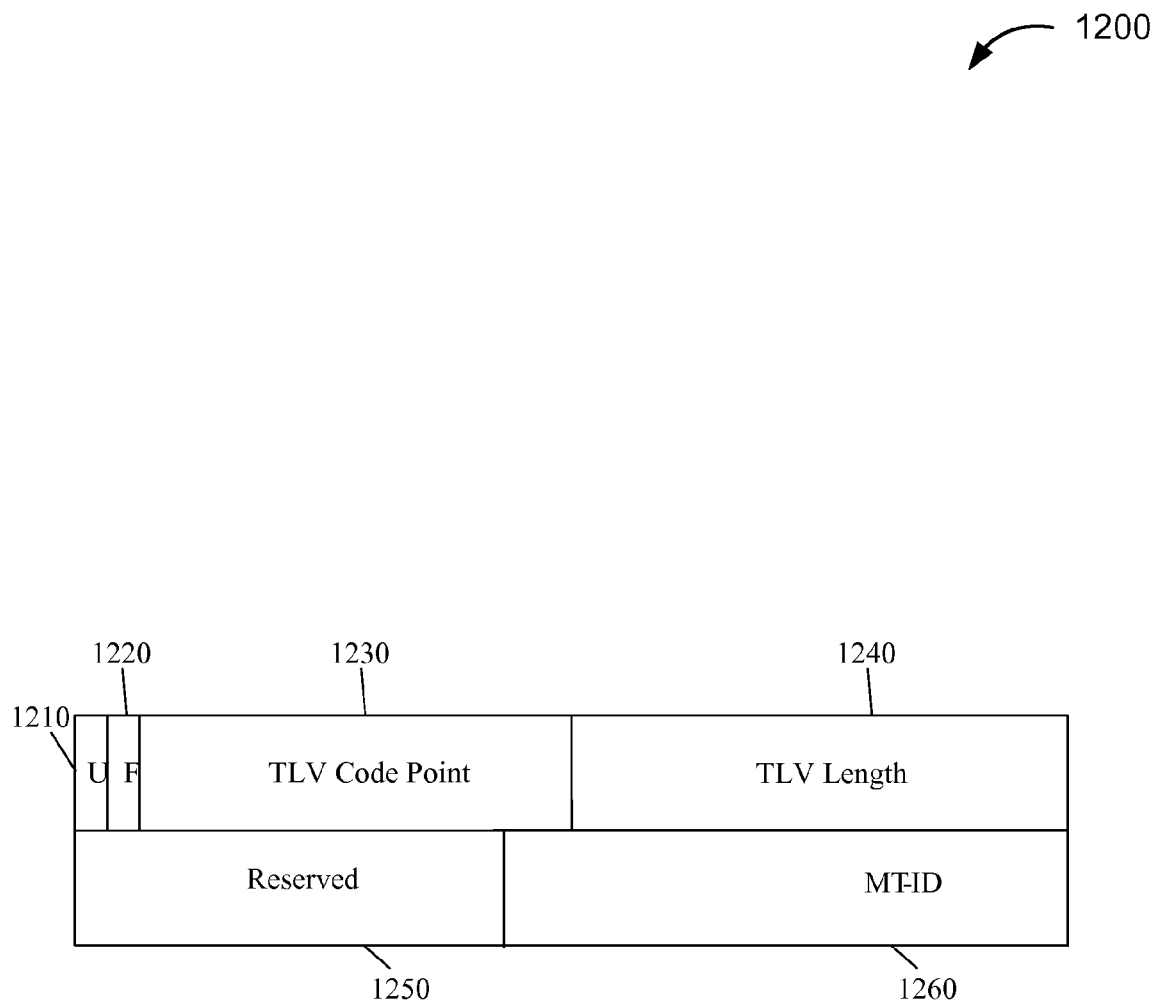
FIG. 12 is an illustration of one embodiment of a MT-ID type length value (TLV), in accordance with various embodiments of the invention.

FIG. 12 is an embodiment of a MT-ID TLV 1200, which may be sent between two neighboring nodes, for example using the label request message 800, the label withdraw message 1200, or the label release message 1100. The MT-ID TLV 1200 may comprise an unknown (U) bit 1210, a forward unknown (F) bit 1220, a TLV code point 1230, a TLV length 1240, a reserved field 1250, and a MT-ID 1260. In an embodiment, the U bit 1210 and the F bit 1220 may each have a length of about one bit, the TLV code point 1230 may have a length of about 14 bits, the TLV length 1240 may have a length of about 16 bits, the reserved field 1250 may have a length of about 12 bits, and the MT-ID 1260 may have a length of about 20 bits.

In an embodiment, the U bit 1210 may be used to indicate how to respond to an unknown received TLV. For instance, if a node receives a message comprising an unknown TLV and the U bit 1210 in the MT-ID TLV 1200 is set, the node may ignore the unknown TLV and process the remaining message content. Alternatively, if the node receives a message comprising an unknown TLV and the U bit 1210 is not set or cleared, the node may ignore the entire message content and/or return the message back to the sending node. The F bit 1220 may be used to indicate whether to forward an unknown received TLV. For instance, if a first node receives from a second node a message comprising an unknown TLV and the F bit 1220 in the MT-ID TLV 1200 is set, the first node may forward the message with the unknown TLV to a third node. Alternatively, if the first node receives from the second node a message comprising an unknown TLV and the F bit 1220 is not set or cleared, the first node may forward the message without the unknown TLV to the third node. Further, the TLV code point 1230 may be assigned a specific type value to indicate a MT-ID TLV, the TLV length 1240 may specify the length of the MT-ID TLV 1200 in bits or bytes, and the reserved field 1250 may not be used or may be reserved for other purposes. The MT-ID 1260 may comprise the MT-ID or topology label assigned to the network topology, for instance from the topology-to-label table. In an embodiment, the MT-ID 1260 may be set equal to about zero to indicate a default topology in the network.

Figure 13:
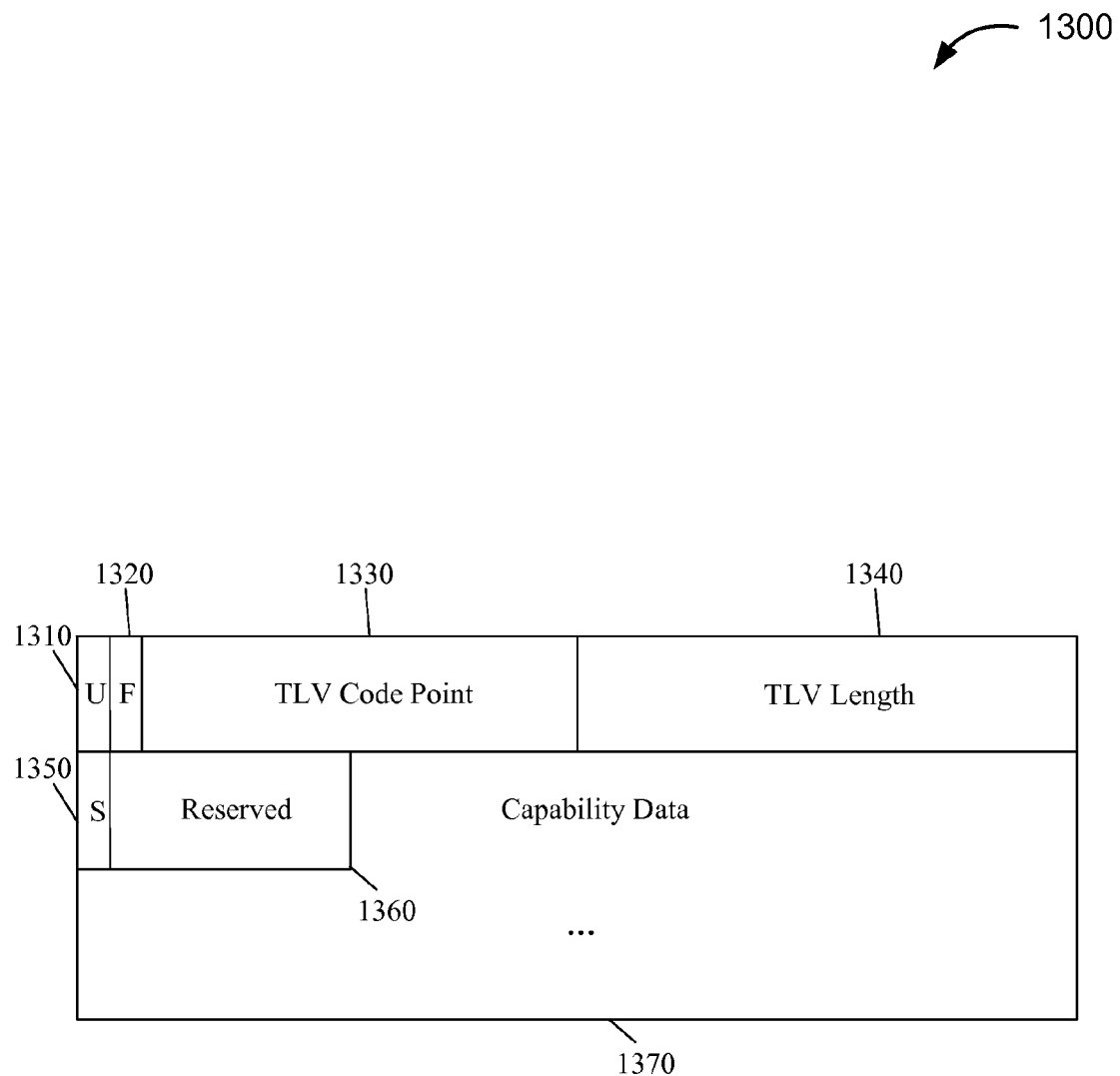
FIG. 13 is an illustration of one embodiment of a MT capability TLV, in accordance with various embodiments of the invention.

FIG. 13 is an embodiment of a MT capability TLV 1300, which may be sent between two neighboring nodes to specify MT capability related information, for example using the session initialization message 500 or the capability message 600. The MT capability TLV 1300 may comprise a U bit 1310, an F bit 1320, a TLV code point 1330, a TLV length 1340, a state (S) bit 1350, a reserved field 1360, and a capability data portion 1370. In an embodiment, the S bit 1350 may have a length of about one bit and the reserved field 1360 may have a length of about seven bits.

The TLV code point 1330 may indicate the node's MT support capability, for example the ability to store mapping tables or exchange such information with other nodes. The S bit 1350 may be used to indicate whether the sending node is advertising or withdrawing the MT support capability for a network topology, for example when the node joins or leaves the network topology. In an embodiment, the S bit 1350 may be set to advertise the capability specified by the TLV code point 1330, or may be cleared to withdraw the capability specified by the TLV code point 1330. The capability data portion 1370 may comprise additional information about the node's capability to support MT in the MPLS network. The remaining fields of the MT capability TLV 1300 may be substantially similar to the corresponding fields of the MT-ID TLV 1200.

Figure 14:
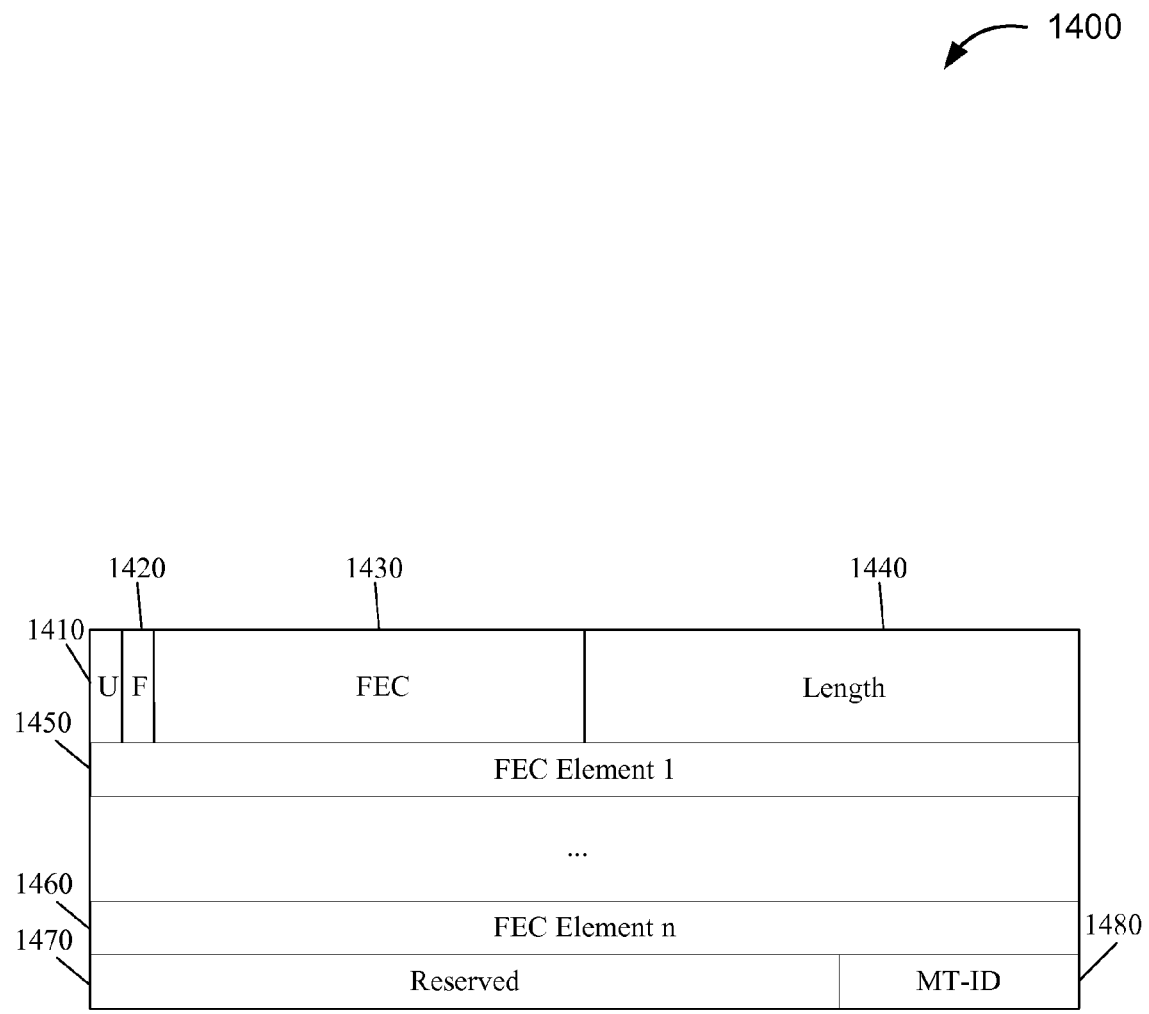
FIG. 14 is an illustration of one embodiment of an extended FEC TLV, in accordance with various embodiments of the invention.

Turning now to FIG. 14, which illustrates one embodiment of an extended FEC TLV 1400, according to aspects of the present invention. Extended FEC TLV 1400 associates FEC elements I-n (1450 and 1460) with the topology identified by the MT-ID 1480. In one embodiment, the FEC TLV 1400 contains only one MT-ID 1480. Extended FEC TLV 1400 further includes those elements similar to MT ID TLV 1200.

In a MT based MPLS network forwarding may not only be based on a label, but also based on the MT-ID associated with the label. In one embodiment, an (FEC, MT-ID) tuple label may be used to implement MPLS forwarding for different topologies implied by the labels. Changes to the existing MPLS hardware forwarding mechanism are not needed in order to implement this approach, and this approach further resolves the forwarding issue that exists in Interior Gateway Protocol (IGP) multi-topology forwarding when multiple topologies share an interface with overlaying addresses. Furthermore, with a MT aware LSR, each label is associated with the tuple (FEC, MT-ID), and therefore, the same FEC with different MT-ID would be assigned to different labels.

Specifically, with the tuples (FEC-F, MT-ID-N1) and (FEC-F, MT-ID-N2), each LSR along the path that is shared by topology MT-ID-N1 and MT-ID-N2 may be allocated with different labels. Thus, two distinguished LSPs are thus created (i.e., one for (FEC-F, MT-ID-N1) and the other for (FEC-F, MT-ID-N1)). The traffic for each label will follow different LSPs. It should be further noted that the label space is not allowed to be overlapped among different MTs. In the above example, each label belongs to a specific topology or the default topology, and the MPLS forwarding will be performed in the same manner as non-MT MPLS forwarding using a label to find the output information. This option does not require any change to hardware forwarding to accommodate MPLS MT.

Table 1 is an example for implementing the above described option:

TABLE 1

| FEC | NEXT HOP |
|---|---|
| RIB(x) for MT-IDx: | |
| FECi(Destination A) | R1 |
| RIB(y) for MT-IDy: | |
| FECi(Destination A) | R1 |
| LFIB: | |
| Ingress Label | Egress Label | NEXT HOP |
| Lm | Lp | R1 |
| Ln | Lq | R2 (could be same as R1) |

Figure 15:
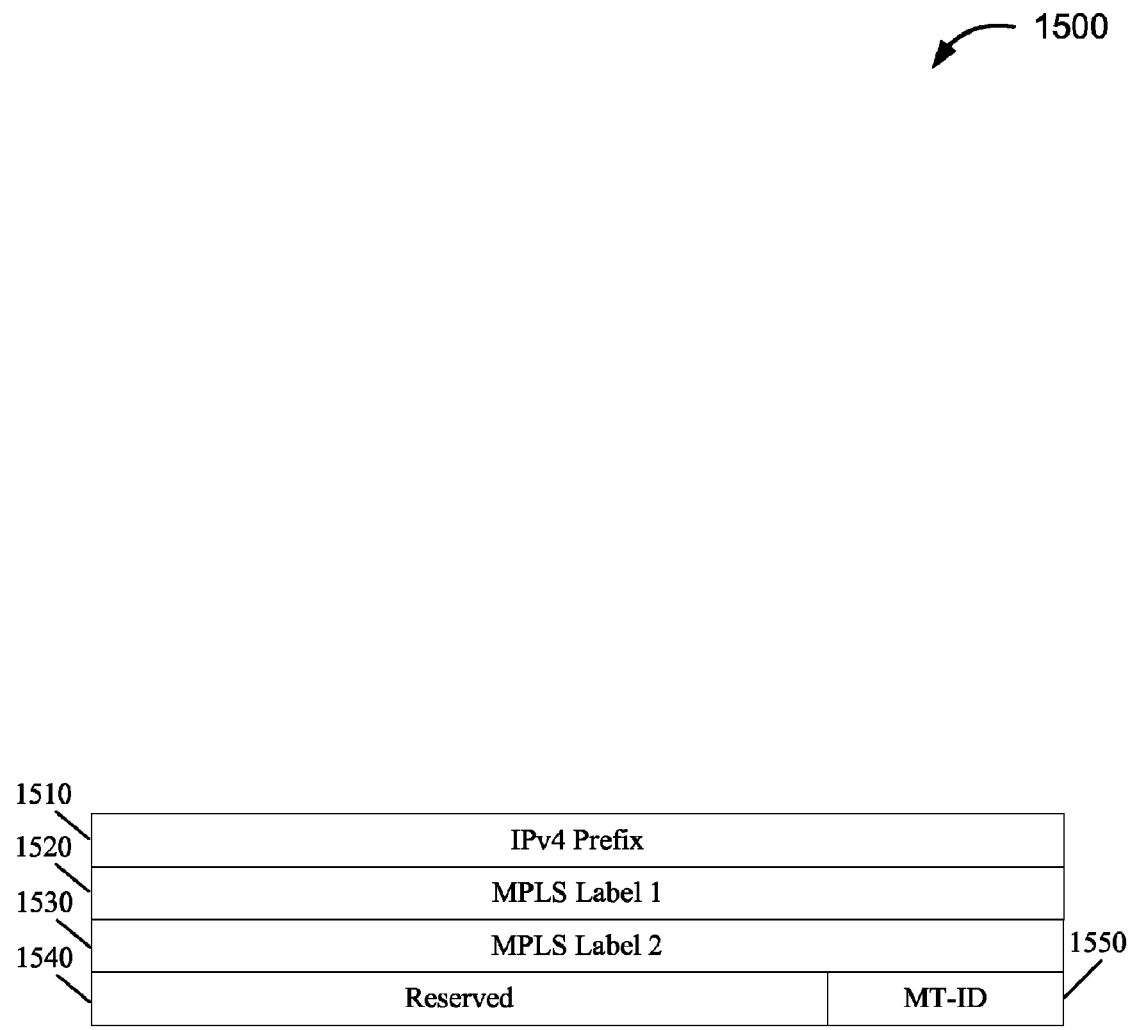
FIG. 15 is an illustration of one embodiment of overlapping label spaces for MT, in accordance with various embodiments of the invention.

Turning next to FIG. 15, which illustrates overlapping label spaces for MT 1500, according to aspects of the present invention. In one embodiment, overlapping label spaces for MT 1500 may include an IPv4 Prefix 1510, an MPLS Label 1 1520, an MPLS Label 2 1530, a reserved space 1540, and an MT-ID 1150. According to this embodiment, the label spaces overlap with each other. This means that the same label value could be used for a different MT.

Referring now to FIG. 16, which illustrates overlapping label spaces for MT with extend label length 1600, according to further aspects of the present invention. Overlapping label spaces for MT with extend label length 1600 may include an IPv4 Prefix 1610, an MPLS Label 1 1620, an MPLS Label 2 1630, and MT Identifiers 1, 2, and 3 (1640, 1650, and 1660). In one embodiment, each of MT Identifiers 1, 2, and 3 (1640, 1650, and 1660) are 12 bits. Furthermore, the label space is overlapped between different MT Identifiers 1640, 1650, and 1660. In one embodiment, the original label is extended from 32 bits to 64 bits. The additional 32 bits may then be used as MT identifier bits.

Table 2 is an example for implementing the configurations described in FIGS. 15 and 16:

TABLE 2

| FEC | | NEXT HOP |
|---|---|---|
| RIB(x) for MT-IDx: | | |
| FECi(Destination A) | | R1 |
| RIB(y) for MT-IDy: | | |
| FECi(Destination A) | | R2 |
| Ingress Label | Egress Label | NEXT HOP |
| LFIB (x): | | |
| Lm | Lp | R1 |
| LFIB (y): | | |
| Lm | Lq | R2 |

FIG. 14 may provides the best backward compatibility and as such does not require hardware changes. Whereas, FIGS. 15 and 16 provide the benefit that each MT is able to have a full label space.

Figure 17:
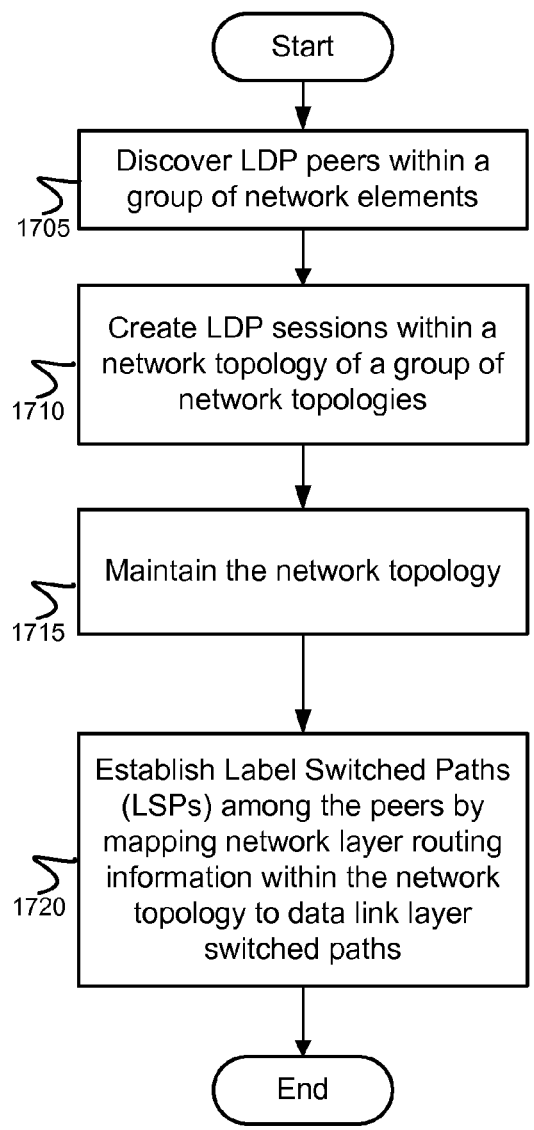
FIG. 17 is an illustration of one embodiment of a method for supporting multi-topology networks, in accordance with various embodiments of the invention.

FIG. 17 illustrates a method 1700 for supporting multi-topology networks. At process block 1705, LDP peers within a group of network elements are discovered. Once the LDP peers are discovered, LDP sessions with a network topology are created (process block 1710). At process block 1715, the network topology is maintained and then Label Switched Paths (LSPs) among the peers are established by mapping network layer routing information within the network topology to data link layer switched paths. Accordingly, the method 1700 is configured to enable the network elements to exchange mappings of label and Forwarding Equivalent Classes (FECs) included within each network topology in the plurality of network topologies.

While the invention has been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods of the invention are not limited to any particular structural and/or functional architecture but instead can be implemented on any suitable hardware, firmware and/or software configuration. Similarly, while various functionality is ascribed to certain system components, unless the context dictates otherwise, this functionality can be distributed among various other system components in accordance with different embodiments of the invention.

Moreover, while the procedures comprised in the methods and processes described herein are described in a particular order for ease of description, unless the context dictates otherwise, various procedures may be reordered, added, and/or omitted in accordance with various embodiments of the invention. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary features, the various components and/or features described herein with respect to a particular embodiment can be substituted, added and/or subtracted from among other described embodiments, unless the context dictates otherwise. Consequently, although the invention has been described with respect to exemplary embodiments, it will be appreciated that the invention is intended to cover all modifications and equivalents within the scope of the following claims.

What is claimed is:

1. A system for implementing a Multi-Protocol Label Switching (MPLS) Label Distribution Protocol (LDP) for Multi-Topology (MT), the system comprising:
a plurality of network elements wherein at least one of the network elements includes interfaces that participate in a plurality of concurrently existing network topologies defined by arrangements of the plurality of network elements; and
a communication mechanism configured to provide communication among the plurality of network elements, wherein the plurality of network elements are configured to discover LDP peers, create and maintain LDP sessions within a network topology of the plurality of concurrently existing network topologies, establish Label Switched Paths (LSPs) among the peers by mapping network layer routing information within a network topology to data link layer switched paths,
wherein the communication mechanism is configured to enable the plurality of network elements to exchange mappings of label and Forwarding Equivalent Classes (FECs) included within each network topology in the plurality of network topologies.

2. The system as in claim 1, wherein each of the plurality of network elements further comprise a mechanism for discovery of LDP peers within each network topology.

3. The system as in claim 2, wherein each of the plurality of network elements further comprise a mechanism for periodically sending LDP Link Hello messages which include additional information about the network topology in which the network element is a participate of, wherein the network elements include interfaces that participate in multiple network topologies and the LDP Hello messages include the network topologies in which the interfaces belong to.

4. The system as in claim 2, wherein each of the plurality of network elements further comprise a mechanism for receiving the LDP Link Hello message which includes network topology information and identifies hello adjacency with a sender of the LDP Link Hello message on an interface along with label space in which the sender intends to use for the topology on the interface.

5. The system as in claim 2, wherein each of the plurality of network elements further comprise a mechanism for periodically sending LDP Targeted Hello messages which include network topology information for the network which the network element participates, and wherein the mechanism participates in multiple network topologies and the LDP Targeted Hello message includes the network topologies which the mechanism belongs to.

6. The system as in claim 5, wherein each of the plurality of network elements further comprise a mechanism for receiving the LDP Targeted Hello message to identify hello adjacency with the network element which sent the Targeted Hello message on an interface along with label space information which the sender intends to use for the topology on the interface.

7. The system as in claim 1, wherein each of the plurality of network elements further comprises a mechanism for creation and maintaining one LDP session for all the network topologies, wherein the LDP session is established using one TCP session with the source address, destination address, source port and destination port regardless which network topology the network element participates.

8. The system as in claim 1, wherein each of the plurality of network elements further comprises a mechanism for creating and maintaining a LDP session for every one of the plurality of network topologies, wherein the LDP session uses a TCP session which is established using a source address, a destination address, a source port, and a destination port, regardless of the network topology in which the network element participates.

9. The system as in claim 7, wherein each of the plurality of network elements further comprises a mechanism for sending an Initialization message to establish a LDP session regardless of which of the plurality of network topologies the LDP session belongs to.

10. The system as in claim 9, wherein each of the plurality of network elements further comprises a mechanism for matching the received Initialization message with one of the Hello adjacencies regardless of which of the plurality of network topologies the LDP session belongs to, and wherein if the Hello adjacency and the Initialization message do not match, then a session rejection message is transmitted, and if the Hello adjacency and the Initialization message match, then an acknowledgement message is transmitted and the LDP session establishment procedures are continued.

11. The system as in claim 10, wherein each of the plurality of network elements further comprises a mechanism for sending a KeepAlive message in response to the network element losing communication with peer network elements, and wherein the mechanism is further configured to reset the KeepAlive timer of the LDP session and maintain the LDP session independent of which network topology the network element belongs to.

12. The system as in claim 11, wherein each of the plurality of network elements further comprises a mechanism for sending additional LDP messages and a reset of the KeepAlive timer of the LDP session independent of which network topology the network element belongs to.

13. The system as in claim 7, wherein each of the plurality of network elements further comprises a mechanism for sending a Shutdown message when the network element leaves the LDP session, and wherein when all the network elements leave the LDP session the TCP session associated with the LDP session is closed.

14. The system as in claim 1, wherein each of the plurality of network elements further comprises a mechanism for including network topology information in one or more of the following:
an Address message, an Address Withdraw message, a Label Mapping message, Label Request message, Label Abort Request message, Label Withdraw message, a Label Release message, and a Notify message, in response to the network element advertising the mapping of label and Forwarding Equivalent Class (FEC) information with the network topology for which the network element participates.

15. The system as in claim 1, wherein each of the plurality of network elements further comprises a mechanism for sending an Initialization message which includes the network topology information for which the network element participates, and wherein a LDP session is established for each network topology for which the network element participates.

16. The system in claim 7, wherein each of the plurality of network elements further comprise a mechanism for advertising the capability of supporting multi-topology during the LDP session establishment stage, and wherein a capability flag is used in an Initialization message to indicate whether the network element is able to support the multi-topology.

17. The system in claim 16, wherein each of the plurality of network elements further comprise a mechanism for advertising the capability of supporting multi-topology after the LDP session is established, and wherein a second capability flag is used in a LDP Capability message to indicate whether the network element is capable of supporting multi-topology.

18. A method for implementing a Multi-Protocol Label Switching (MPLS) Label Distribution Protocol (LDP) for Multi-Topology (MT), the method comprising: discovering LDP peers within a plurality of network elements wherein at least one of the network elements includes interfaces that participate in a plurality of concurrently existing network topologies defined by arrangements of the plurality of network elements; creating LDP sessions within a network topology of the plurality of concurrently existing network topologies; maintaining the network topology; establishing Label Switched Paths (LSPs) among the peers by mapping network layer routing information within the network topology to data link layer switched paths, and enabling the plurality of network elements to exchange mappings of label and Forwarding Equivalent Classes (FECs) included within each network topology in the plurality of network topologies.

19. The method as in claim 18, further comprising:
periodically sending LDP Link Hello messages which include additional information about the network topology in which the network element is a participate of, wherein the network elements include interfaces that participate in multiple network topologies and the LDP Hello messages include the network topologies in which the interfaces belong to.

20. A non-transitory machine-readable medium for implementing a Multi-Protocol Label Switching (MPLS) Label Distribution Protocol (LDP) for Multi-Topology (MT), having sets of instructions stored thereon which, when executed by a machine, cause the machine to: discover LDP peers within a plurality of network elements wherein at least one of the network elements includes interfaces that participate in a plurality of concurrently existing network topologies defined by arrangements of the plurality of network elements; create LDP sessions within a network topology of the plurality of concurrently existing network topologies; maintain the network topology; and establish Label Switched Paths (LSPs) among the peers by mapping network layer routing information within the network topology to data link layer switched paths, and enable the plurality of network elements to exchange mappings of label and Forwarding Equivalent Classes (FECs) included within each network topology in the plurality of network topologies.

* * * * *